US008493992B2

(12) United States Patent
Sella et al.

(10) Patent No.: US 8,493,992 B2
(45) Date of Patent: Jul. 23, 2013

(54) INTERRELATED WIFI AND USB PROTOCOLS AND OTHER APPLICATION FRAMEWORK PROCESSES, CIRCUITS AND SYSTEMS

(75) Inventors: Assaf Sella, Rishpon (IL); Leonardo W. Estevez, Rowlett, TX (US); Ian Sherlock, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 379 days.

(21) Appl. No.: 13/014,882

(22) Filed: Jan. 27, 2011

(65) Prior Publication Data
US 2011/0188391 A1    Aug. 4, 2011

Related U.S. Application Data

(60) Provisional application No. 61/301,269, filed on Feb. 4, 2010.

(51) Int. Cl.
*H04W 24/10* (2009.01)
*H04W 88/08* (2009.01)
*H04W 72/00* (2009.01)

(52) U.S. Cl.
USPC ........... 370/445; 370/252; 370/328; 370/338; 455/552.1

(58) Field of Classification Search
USPC ................. 370/252, 311, 328, 329, 338, 342, 370/346, 445; 375/147, 220, 222; 455/434, 455/552.1
See application file for complete search history.

(56) References Cited

U.S. PATENT DOCUMENTS

| 5,487,069 A | 1/1996 | O'Sullivan et al. |
| 8,089,946 B2 * | 1/2012 | Brommer ...................... 370/346 |
| 2005/0135318 A1 * | 6/2005 | Walton et al. ................. 370/338 |
| 2005/0286546 A1 | 12/2005 | Bassoli et al. |
| 2006/0050742 A1 | 3/2006 | Grandhi et al. |

(Continued)

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications. Sec. 7.3.2 Information Elements. IEEE Std 802.11™-2007. pp. 59-61, 72-81, 99-101, 254, 292, 303-305, 419-420. http://standards.ieee.org/getieee802/download/802.11-2007.pdf Figs. 7-37, 9-22, Table 7-26.

(Continued)

*Primary Examiner* — Afsar M Qureshi
(74) *Attorney, Agent, or Firm* — James F. Hollander; Wade J. Brady, III; Frederick J. Telecky, Jr.

(57) ABSTRACT

A master electronic circuit (300) includes a storage (324) representing a wireless collision avoidance networking process (332) involving collision avoidance overhead and combined with a schedulable process (345) including a serial data transfer process and a scheduler, a wireless modem (350) operable to transmit and receive wireless signals for the networking process (332), and a processor (320) coupled with the storage (324) and with the wireless modem (350) and operable to execute the scheduler to establish and transmit a schedule (110) for plural serial data transfers involving the processor (320) and distinct station identifications, and to execute the serial data transfers inside the wireless networking process and according to the schedule so as to avoid at least some of the collision avoidance overhead. Other electronic circuits, processes of making and using, and systems are disclosed.

21 Claims, 13 Drawing Sheets

U.S. PATENT DOCUMENTS

| | | | |
|---|---|---|---|
| 2007/0061436 | A1 | 3/2007 | Bae et al. |
| 2008/0159210 | A1 | 7/2008 | Zaks et al. |
| 2008/0170551 | A1 | 7/2008 | Zaks |
| 2008/0170552 | A1 | 7/2008 | Zaks |
| 2008/0181154 | A1 | 7/2008 | Sherman |
| 2008/0192129 | A1 | 8/2008 | Walker et al. |
| 2008/0254745 | A1 | 10/2008 | Zhang et al. |
| 2008/0254752 | A1 | 10/2008 | Oh et al. |
| 2008/0267160 | A1 | 10/2008 | Ibrahim et al. |
| 2008/0310391 | A1 | 12/2008 | Schneidman et al. |
| 2009/0089476 | A1 | 4/2009 | Oh et al. |
| 2009/0196210 | A1* | 8/2009 | Desai .............. 370/311 |
| 2010/0002627 | A1* | 1/2010 | Ngo et al. .............. 370/328 |
| 2010/0008338 | A1 | 1/2010 | Tsfati et al. |
| 2010/0020746 | A1 | 1/2010 | Zaks |
| 2010/0153600 | A1 | 6/2010 | Sthoeger et al. |
| 2010/0198999 | A1 | 8/2010 | Nair et al. |
| 2010/0201845 | A1 | 8/2010 | Feinberg et al. |
| 2010/0226300 | A1 | 9/2010 | Leow et al. |
| 2010/0226348 | A1 | 9/2010 | Thoukydides |
| 2010/0260146 | A1 | 10/2010 | Lu |
| 2010/0265895 | A1* | 10/2010 | Bracha .............. 370/329 |
| 2010/0271959 | A1 | 10/2010 | Qi et al. |
| 2010/0278062 | A1 | 11/2010 | Abraham et al. |
| 2010/0278065 | A1 | 11/2010 | Sun et al. |
| 2010/0329131 | A1* | 12/2010 | Oyman et al. .............. 370/252 |
| 2010/0329202 | A1 | 12/2010 | Sun et al. |

OTHER PUBLICATIONS

Wireless Universal Serial Bus Specification Revision 1.1, Sep. 9, 2010. http://www.usb.org/developers/wusb/docs pp. 14, 25-26, 32-34, 40-41, 43-45, 90, 98, 104, 110, 181-183. Figs. 3-2, 4-2-4-5, 4-11-4-13, 4-16, 4-17, 4-41, 5-1-5-4, 5-6.

Wi-Fi Peer-to-Peer (P2P) Technical Specification: Version 1.1. Wi-Fi Alliance Technical Committee, P2P Task Group. Wi-Fi Alliance, 2010. pp. 60-65, 89-91, 109-110, 117. http://www.wi-fi.org/Wi-Fi_Direct.php Figs. 8-11, A1.

Universal Serial Bus Specification Revision 2.0 (Apr. 27, 2000). http://www.usb.org/home pp. 16, 20-21, 23, 26, 32-35, 70, 195-196, 211, 276, 284, 288. Figs. 4-1, 4-4, 5-2, 5-9, 5-10, 5-17, 8-1, 10-2, 10-4, 10-5.

WiMedia Alliance. Distributed Medium Access Control (MAC) for Wireless Networks (MAC Specification: Release 1.5), Dec. 1, 2009. pp. 7-8, 10, 91-93, 113, 144, 151. http://www.wimedia.org/en/specs.asp?id=specs Figs. 1-3, 42, 86, 94-96, Table 61.

Inno-Logic. Timing Synchronization in WUSB Devices. (undated) 8pp. http://www.inno-logic.com/resourcesTimingSynchronization.html Figs.: All.

DWL-G122 High Speed 2.4GHz (802.11g) Wireless USB Adapter (undated). 1 p. http://www.dlink.com/products/?pid=334 Single Fig.

* cited by examiner

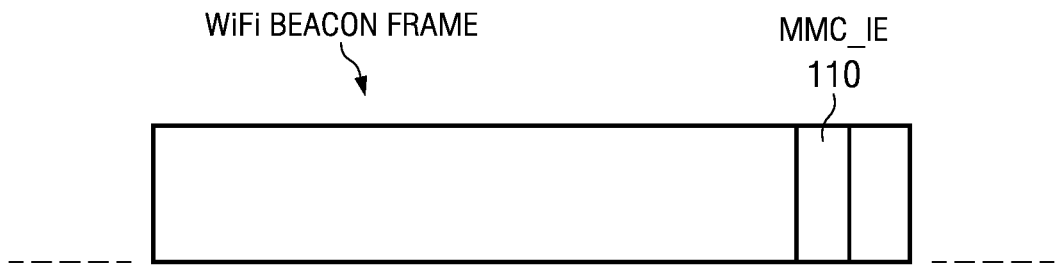
FIG. 5
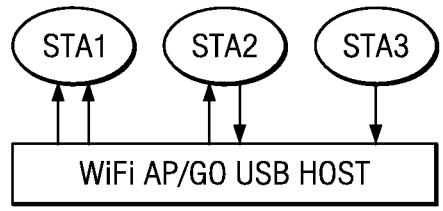
FIG. 6
| MMC_IE ID CODE | MMC_IE LENGTH | OUT/IN | TIME T1 | DURATION D1 |
|---|---|---|---|---|
| STA# | TYPE | | | |
| #1 | DATA | OUT | 2100 | 900 |
| #2 | DATA | OUT | 3200 | 600 |
| #3 | DATA | IN | 3900 | 1500 |
| #1 | DATA | OUT | 55K | 900 |
| #2 | DATA | IN | 56K | 700 |
MMC_IE 110
FIG. 7

| SLAVE SCHEDULES | STA# | TYPE | OUT/IN | TIME T1 | DURATION D1 |
|---|---|---|---|---|---|
| 121 { | #1 | DATA | OUT | 2100 | 900 |
| | #1 | DATA | OUT | 55K | 900 |
| 122 { | #2 | DATA | OUT | 3200 | 600 |
| | #2 | DATA | IN | 56K | 700 |
| 123 — | #3 | DATA | IN | 3900 | 1500 |

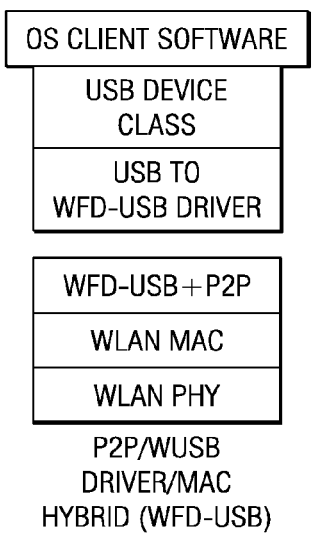
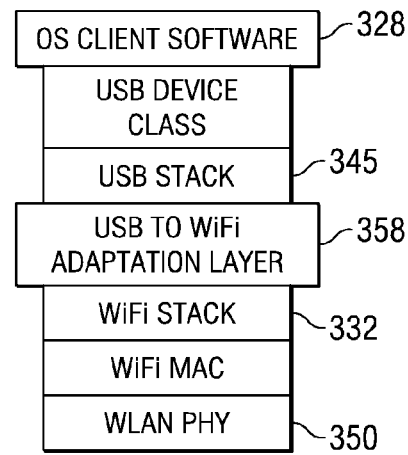
*FIG. 17A*
*FIG. 18*
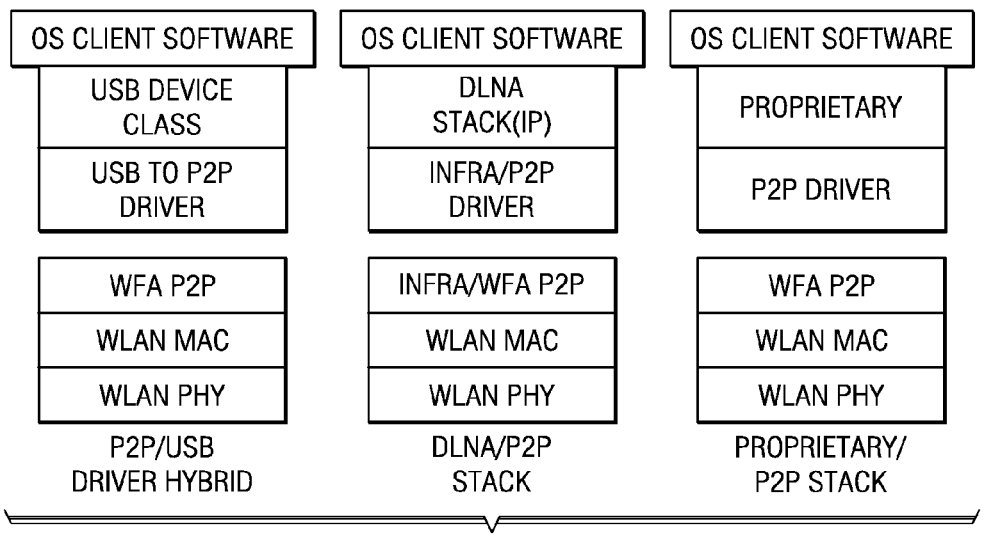
*FIG. 17B*
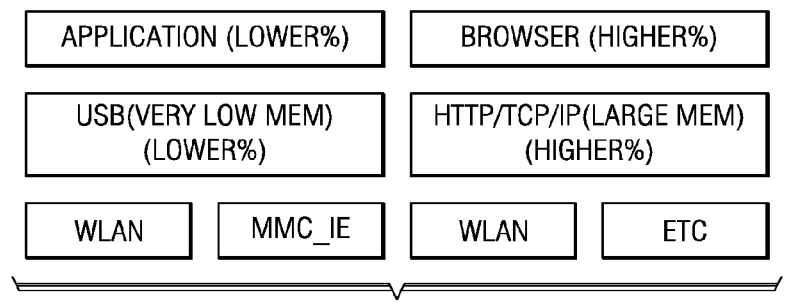
*FIG. 19*

INTERRELATED WIFI AND USB PROTOCOLS AND OTHER APPLICATION FRAMEWORK PROCESSES, CIRCUITS AND SYSTEMS

CROSS-REFERENCES TO RELATED APPLICATIONS

This application is related to provisional U.S. Patent Application "WiFi Direct USB Protocol and Application Framework" Ser. No. 61/301,269 filed Feb. 4, 2010, for which priority is claimed under 35 U.S.C. 119(e) and all other applicable law, and which is incorporated herein by reference in its entirety.

This application is related to U.S. Published Patent Application 20100329202 "Channel Utilization Improvement in Coexisting Wireless Networks" dated Dec. 30, 2010, which is incorporated herein by reference in its entirety.

This application is related to U.S. Published Patent Application 20100278065 "Traffic Load Estimation for Access Point Functionality Enabled Mobile Devices" dated Nov. 4, 2010, which is incorporated herein by reference in its entirety.

This application is related to U.S. Published Patent Application 20080170552 "Idle Connection State Power Consumption Reduction in a Wireless Local Area Network Using Variable Beacon Data Advertisement" dated Jul. 17, 2008, which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND

Among the fields of the invention are electronic wireless networking, wireless networking circuits and devices, and circuits and processes for network control and data transfer in such networks, circuits and devices.

Consumer electronics devices should desirably be interconnected with one another for control and data transfer between them. Important considerations for such devices individually and collectively in networks include favorable user experience, fast data transfer of different kinds of data and data streams that have different quality of service (QoS) needs, minimum power consumption especially in mobile devices, and convenience of connecting and getting different devices to work with one another. Not surprisingly, these and other considerations or dimensions of performance trade off with one another, and advances in the art that could somehow provide enhanced performance on multiple such dimensions concurrently would be most desirable.

Exciting uses of consumer electronics in today's world are increasingly featuring computerized applications that involve streaming data and/or large files on fixed, portable, and mobile devices. Some of these applications include internet audio, video, and movies and other content on demand, internet video conferencing, gaming, social networking sites, still picture galleries, large downloadable files and objects, location-based services for mobile and other devices, and many others. Accordingly, technologies for rapidly handling streaming data and/or large files on fixed, portable, and mobile devices are of considerable importance to both the industry and the public.

Among various wired forms of device interconnection is Universal Serial Bus (USB), such as USB 2.0, which is a standardized form of fast data transfer that has a recognizable socket on the side of many devices familiar to consumer public. Cords with distinctive USB plugs connect to such devices, and these cords have length constraints and are manually connected.

One form of wireless local area networking (WLAN) is called WiFi, or IEEE 802.11. In many computers and mobile devices, a WiFi modem is built-in, such as for wirelessly connecting to a WiFi access point (AP) that may also be called a router, gateway, or hotspot. And for computers lacking such a built-in WiFi modem, a kind of product called a WLAN adapter or dongle has a USB plug connected by a cable to a thumb-sized modem unit outboard of the computer. Whether built-in or outboard, this WiFi unit uses a mechanism where in multiple devices in the wireless network compete for use of the wireless medium or space and frequencies by which they communicate. An electronic process of collision avoidance, and arbitrating about which device will be using the medium at any given time, takes up time and constrains the speed or bandwidth of this type of network for fast transfer of streaming data and large files. A conventional type of WiFi modem or WLAN adapter simply couples to computer applications in some manner at a high software level called an application layer, and physically is coupled over an internal computer parallel bus or in serial manner perhaps by USB for the data to get to the WiFi modem or WLAN adapter. The wireless network like WiFi then operates according and subject to its above-mentioned native constraints that cause data throughput for particular devices to vary, because of factors such as network overhead as well as current volume of network traffic and environmental factors like building structures.

Another form of wireless communication called Ultra Wide Band (UWB) has a limited range and has been used to provide a kind of wireless USB called WUSB. This WUSB technology is attractive. Nonetheless, it remains to be seen the extent to which that WUSB/UWB type of technology will penetrate the consumer space, which is extremely cost sensitive and in the mobile devices is especially sensitive to power consumption issues and additional complexities of hardware, software and wireless coexistence with other wireless communications modems and their different software methodologies and stacks.

Accordingly, significant departures and alternatives in circuits, processes and systems for addressing the above considerations and problems would be most desirable.

SUMMARY OF THE INVENTION

In general, and in one form of the invention, a master electronic circuit includes a storage representing a wireless collision avoidance networking process involving collision avoidance overhead and combined with a schedulable process including a serial data transfer process and a scheduler, a wireless modem operable to transmit and receive wireless signals for the networking process, and a processor coupled with the storage and with the wireless modem and operable to execute the scheduler to establish and transmit a schedule for plural serial data transfers involving the processor and distinct station identifications, and to execute the serial data transfers inside the wireless networking process and according to the schedule so as to avoid at least some of the collision avoidance overhead.

In general, and in another form of the invention, a master electronic circuit includes a storage representing a wireless networking program compatible with WiFi and combined with a data transfer process compatible with USB, a wireless modem operable and compatible with WiFi, and a processor coupled with the storage and with the wireless modem and operable to execute the wireless networking program to establish the circuit as a WiFi access point (AP) and thereby also as a USB wireless host for WiFi.

In general, and in a further form of the invention, an electronic circuit includes a storage representing a peer-to-peer wireless networking process compatible with WiFi Direct and combined with a data transfer process compatible with USB, a wireless modem compatible with the WiFi Direct, and a processor coupled with the storage and with the wireless modem and operable to execute a role negotiation via the wireless modem to selectively establish the circuit either as a WiFi Direct peer designated as a group owner or a WiFi Direct peer designated as a client device depending on a result of the role negotiation, the processor responsive to the result of group owner to operate as a USB host for the USB-like data transfer process wirelessly and the processor responsive to the result of client device to operate instead as a USB slave for the data transfer process wirelessly.

Generally, and in an additional form of the invention, a slave electronic circuit includes a storage representing a wireless collision avoidance networking process involving collision avoidance overhead and combined with a schedule-driven serial data transfer process, a wireless modem operable to transmit and receive wireless signals for the networking process, and a processor coupled with the storage and with the wireless modem and operable to receive a schedule for plural serial data transfers involving the processor and distinct station identifications, and to execute any serial data transfers scheduled for the slave inside the wireless networking process and according to the schedule so as to avoid at least some of the collision avoidance overhead.

Generally, and in another additional form of the invention, a slave electronic circuit includes a storage representing a wireless networking process compatible with WiFi and combined with a data transfer process compatible with USB, a wireless modem compatible with WiFi, and a processor coupled with the storage and with the wireless modem and operable to execute the wireless networking process to establish the circuit as a WiFi device instead of an access point AP, and also establish the circuit as a USB-like slave function in wireless.

Generally, and in a process form of the invention, a wireless master process includes a wireless collision avoidance networking process involving collision avoidance overhead, a schedulable serial data transfer process combined with the wireless collision avoidance networking process and including a scheduling process to establish and wirelessly transmit a schedule in advance for subsequent serial data transfers involving distinct station identifications, protecting the wireless medium in a manner that will at least piecewise encompass the scheduled serial data transfers, and wirelessly executing the serial data transfers according to the schedule so as to avoid at least some of the collision avoidance overhead.

Generally, and in another process form of the invention, a wireless slave process includes a wireless collision avoidance networking process involving collision avoidance overhead and combined with a schedule-driven serial data transfer process, wirelessly receiving a schedule for specifying serial data transfers and their station identifications; and executing any serial data transfers scheduled by a such station identification for the slave process itself inside the wireless networking process and according to the schedule so as to obviate at least some of the collision avoidance overhead.

Other electronic circuits, processes of making and using, and systems are disclosed and claimed.

BRIEF DESCRIPTION OF THE DRAWINGS

FIG. 5 is a stream diagram versus time of an inventive WiFi beacon frame having information elements (IEs) including an MMC_IE in an inventive WiFi-based USB system and process.

FIG. 6 is a cutaway portion of the FIG. 2 network topology diagram showing stations STA and AP/Host involved in inventive USB-like operations of FIG. 4 and inventively scheduled as in FIGS. 7 and 10.

FIG. 7 is a detail of the inventive WiFi-based USB MMC_IE (Micro-scheduled Management Command Information Element) of FIG. 5.

FIG. 17A is a protocol stack diagram of an inventive WiFi-Direct-USB protocol stack.

FIG. 17B is a set of protocol stack diagrams of other possible approaches or bases for embodiments for comparison with FIG. 17B.

FIG. 18 is a protocol stack diagram of an inventive WiFi-based USB protocol stack including an inventive adaptation layer between a USB stack and a WiFi stack that provides master and/or slave functionalities for inventive WiFi-based USB embodiments.

FIG. 19 is a pair of protocol stack diagrams showing benefits of an inventive WiFi-based USB protocol stack on left compared with a WLAN TCP/IP internet protocol stack on right.

FIG. 23 is organized as a composite of three timing diagrams for transmission TX, reception RX, and medium protection (PD, NAV).

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Without limitation, some embodiments are described in a manner employing, facilitated by or leveraging some popular standardized technologies such as WiFi (IEEE 802.11), WiFi Direct, and USB (Universal Serial Bus). In this way, without unduly extending or obscuring the thorough overall detailed description for the embodiments herein, various supportive or background features or portions used herein that have standardized details already published are efficiently referred to and provide context. Additionally, other embodiments according to the teachings herein can be prepared using non-standardized approaches or yet-to-be standardized approaches as well.

Figure 1:
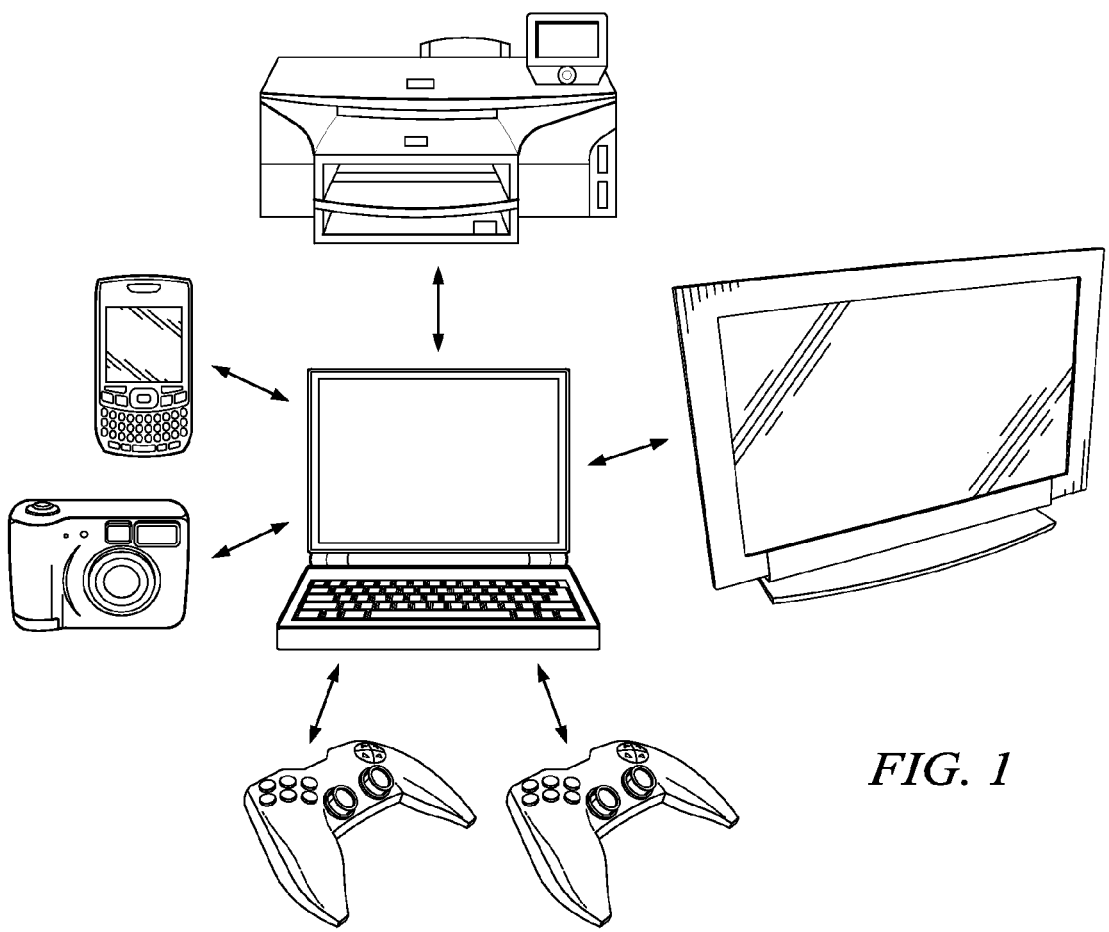
FIG. 1 is a pictorial diagram of various consumer electronics (CE) device embodiments coupled for fast, economical volume transfers of data according to some inventive circuit embodiments and inventive WiFi-based USB protocols or processes of other Figures herein.

In FIG. 1, numerous consumer electronics devices are wirelessly coupled with one another with lower computer burden, lower memory usage, and higher efficiency and power savings. A laptop, printer, high definition HD display device, digital camera, gaming controls, and mobile handset/palmtop form a multi-station wireless system embodiment. In the illustrated example, the laptop embodiment acts as both an AP/Group Owner for wireless networking purposes and as an enhanced USB host interacting with enhanced WiFi for WiFi-based USB-like operations that deliver user-convenient, fast, economical volume transfers of data according to the Figures herein. Each of the other devices provides an embodiment and is interoperable with legacy devices.

Figure 2:
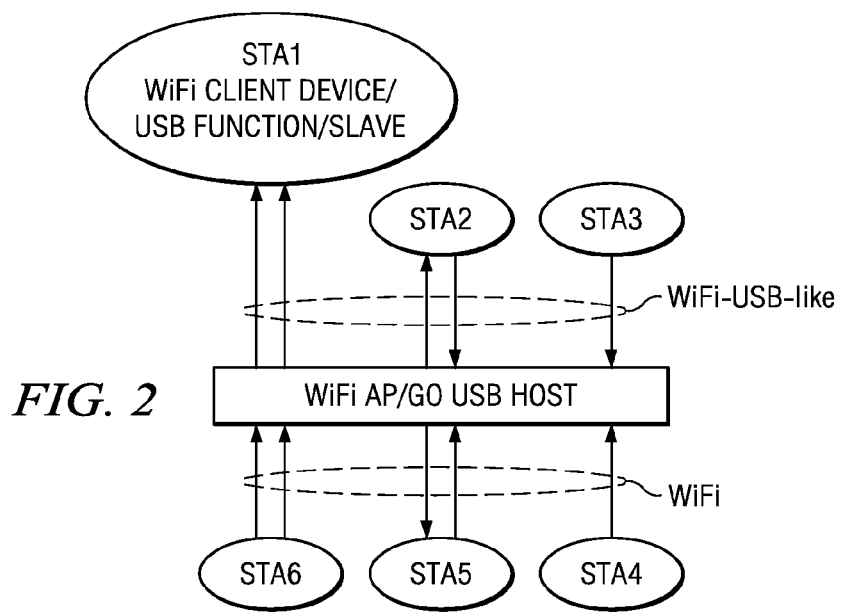
FIG. 2 is a network topology diagram of an inventive WLAN system with an Access Point AP acting as a WiFi-based USB Host wirelessly communicating as a Master with one or more WLAN stations STA as Slave stations.
Figure 4:
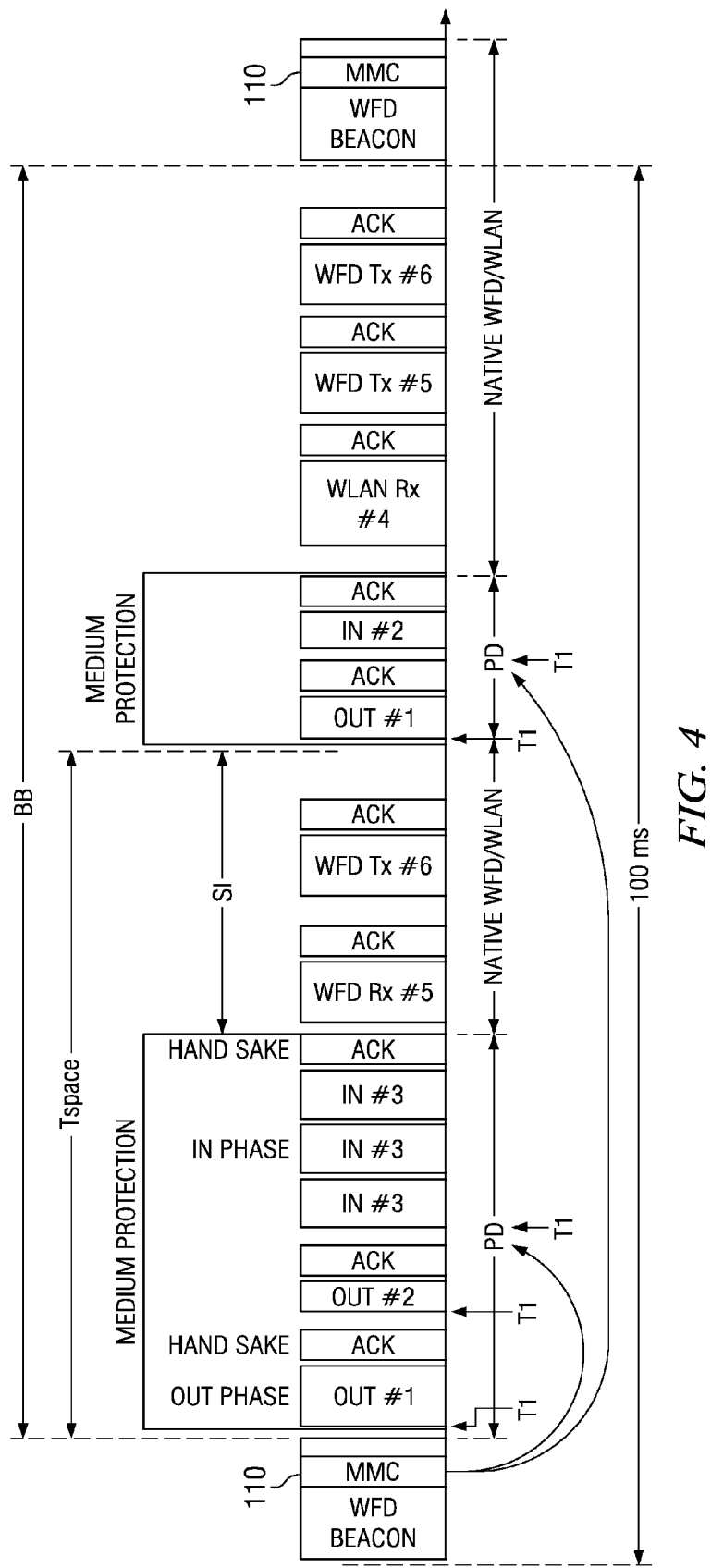
FIG. 4 is a stream timing diagram of an inventive WiFi-based USB process including a detail of USB-like operations inventively established, arranged, controlled and cooperatively and synergistically interspersed and combined with operations like WiFi or WiFi-Direct.

In FIG. 2, the multi-station wireless system embodiment of FIG. 1 is depicted in block diagram form to show how a WiFi-based USB stream process embodiment of FIG. 4 operates in the system. For convenience of illustration in FIGS. 2 and 4, WiFi-based USB-like operations are represented by in/out arrows between the notebook computer acting as WiFi AP/Group Owner/USB host and a first three WiFi stations STA 1, STA 2, STA 3 (e.g., the printer, HD display, and digital still camera of FIG. 1). The arrows represent wireless USB-like communications that occur at distinct times during a particular illustrated time interval of FIG. 4. Another three WiFi stations STA 4, STA 5, STA 6 (e.g., the first gaming control, the second gaming control, and the mobile handset or tablet device) are WiFi-networked to the AP without USB-like operations during the particular illustrated time interval of FIG. 4, and those latter stations STA 4, 5, 6 may themselves participate in USB-like operations at other times.

Figure 3:
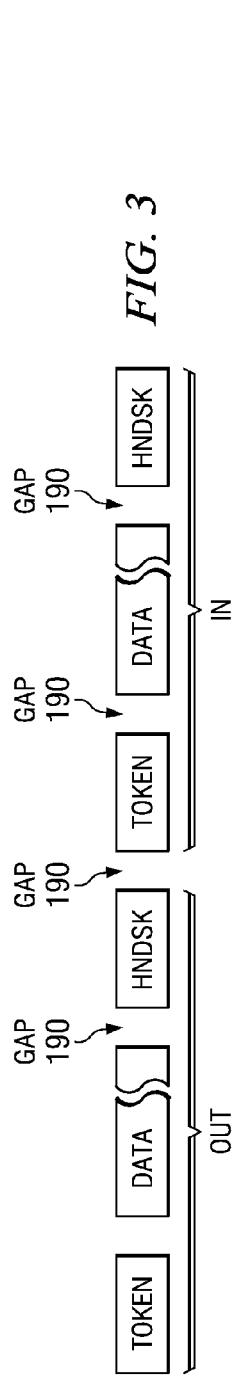
FIG. 3 is a stream timing diagram of operations in wired USB 2.0 for inventive combination into FIG. 4 and as enhanced therein.

Among some of the various embodiments, an important recognition is the manner and benefits of revising a WiFi or WiFi Direct protocol to be able to both act like FIG. 3 wired USB protocol sometimes and still support any WiFi wireless networking operations, peer-to-peer P2P operations and intelligent power management. A WiFi or WiFi Direct protocol has beacon signals separated by intervals called beacon periods. A WiFi access point AP, or a WiFi Direct peer designated AP/Group Owner, is provided with modifications that have ability to designate particular peer stations like STA 1-3 and schedule some times in the next beacon period for USB-like operations by such stations that are allocated inside the beacon time. These other stations or peers are provided with modifications to act like one or more respective USB functions, called slaves herein, when designated and scheduled for slave operation at such times. To do this, some illustrated embodiments introduce, provide or add a special information element IE—a special kind of micro-scheduled management commands MMC_IE 110—to the WLAN AP or WiFi Direct P2P Beacon Group Owner to schedule access times for the WiFi network that make the WiFi Direct network sometimes act like a wireless form of USB inside of WiFi.

Embodiments for electronic circuits and processes thus provide a remarkable Wireless USB protocol called WiFi-based USB herein or WiFi-Direct-USB or WUSB 2.0 herein defined on top of WiFi which enables more efficient use of spectrum, e.g. scheduled access), and efficient implementation (processing requirements, memory footprint). WiFi-Direct-USB enables infrastructure to develop peer-to-peer (P2P) applications, and leverages herein on the large installed base of USB efficient and compact protocol stack and USB user experience. WiFi-based USB herein builds on proven WiFi technology and leverages on the large installed base of WiFi too. WiFi-based USB herein reuses USB investment in operating system etc, and can therefore desirably proliferate to the consumer electronics (CE) market and other markets.

Various embodiments provide, among various items unique to their synergistic WiFi (or WiFi-Direct) and USB combination making them different, more challenging, and/or more remarkable: A) conversion of the native WLAN network access protocol (e.g., CSMA/CA) to a USB-like bus-access protocol on demand. This enables an easy composition of a USB protocol stack on-top of the medium adaptation layer, and improves the predictability, and efficiency of the transport layer. B) Protection processes and structures compliant to or not inconsistent with the WLAN protocol enable coexistence of a WiFi-based USB embodiment with native WLAN/WiFi-Direct nodes and networks. C) WiFi or WiFi-Direct protocol (link establishment, link management, power-saving, etc.) is efficiently utilized to implement USB functionality wirelessly by adding and removing nodes, effectuating master/slave role negotiations, power saving, and other network supports.

Technology such as Digital Living Network Alliance DLNA-compatible can discover music, video, and pictures in a home network and stream them to a rendering device. WiFi-Direct-USB embodiments can support such streaming. The rendering device can decode the multimedia format (JPEG, MP3, AVI) and render it on an attached peripheral. WiFi-based USB embodiments herein can support virtual attachment for the peripheral as well. USB 2.0 has a high-speed mode at 480 Mbps and a low-speed mode at 1.5 Mbps, and some WiFi-based USB embodiments mimic these speeds for USB-like transfers.

TABLE 1 provides a Glossary of selected terminology used or adopted herein to describe some embodiments and to provide some background terminology for combining and enhancing WiFi and USB.

TABLE 1

| GLOSSARY | |
|---|---|
| AP: | Access Point, a Wi-Fi base station |
| Backoff Value: | Collision avoidance support |
| Beacon (TIM): | Traffic Indication Map |
| BSS: | Basic Service Set, a Wi-Fi cell. |
| CE: | Consumer Electronics |
| Client: | For WiFi-based USB herein, meanings of 'client' depend on the context. 'Client' for USB-like purposes is Host (Master) software that arranges data transfers between a USB function (Slave) and the USB Host (Master). By contrast, 'Client' for WiFi-Direct-like purposes is a wireless device in the network other than the Group Owner. |
| CSMA/CA: | Carrier Sense Multiple Access/Collision Avoidance used in some WLAN. Station backs off for a time period if another station is transmitting, then checks again until clear.<br>Other types of collision avoidance processes and their acronyms exist and may be used in some embodiments. |
| CSMA/CS: | Carrier Sense Multiple Access protocol used in WiFi wherein stations listen and wait for a clear space before transmitting. |
| CTS: | Clear to Send packet in 802.11 |
| CTS2Self | Clear to Send to Self packet, CTS for USB-like PD |
| CTWindow: | Client Traffic Window. Period during which WiFi-Direct Client may transition from Power Save to Active Mode |
| DLNA: | Digital Living Network Alliance |
| Doze: | Low power state |
| Group Owner: | A WiFi-Direct station that takes role of Access Point |
| HCCA: | HCF Controlled Channel Access |
| HCF: | Hybrid Coordination Function in IEEE 802.11e for QoS. |
| IBSS: | Independent BSS |

TABLE 1-continued

| GLOSSARY | |
|---|---|
| IE: | Information Element of 802.11 |
| IRP: | Input/Output Request Packet |
| Master: | A WiFi-based USB station embodiment that acts both as a WiFi AP for WiFi-like operations and as a USB Host for USB-like operations. See also Slave. |
| MAC: | Medium Access Control, 802.11 |
| MAC_I | Initiator MAC address |
| MAC_P | Peer MAC address |
| MIC | Message integrity code |
| MLME | MAC sublayer management entity |
| MMPDU | MAC management protocol data unit |
| MPDU | MAC protocol data unit |
| MSDU | MAC service data unit |
| MAD: | Medium Access Delay |
| MMC_IE: | Special Micro-scheduled Management Command Information Element used in some embodiments of WiFi-based USB |
| NAV | Network Allocation Vector. A station sends a number NAV = X milliseconds to hold a channel for X milliseconds after that channel is assigned to it and another station. Sending NAV = 0 gives up the channel. |
| NoA: | Notice of Absence |
| NrPD: | Number of PDs to transfer given data |
| NrPDBB: | Number of PDs between beacons |
| PM = 0/1 | Power Management off/on |
| PD | Protected Medium Duration of a time during which wireless medium is continuously protected for use in USB-like operations of WiFi-based USB embodiments. |
| PS Mode: | Power Save |
| P2P: | Peer-to-Peer |
| QoS: | Quality of Service |
| RX: | Receive |
| SI: | Spacing Interval between PDs in WiFi-based USB embodiment |
| SIFS: | Short Interframe Space, time between a data frame and acknowledgment. |
| Slave: | A WiFi-based USB station STA embodiment that acts both as a WiFi non-AP Device for WiFi-like operations and as a USB function for USB-like operations |
| STA: | Station |
| TBTT: | Target beacon transmission time |
| TSF: | Timing Synchronization Function transmitted in beacon |
| TX: | Transmit |
| USB: | Universal Serial Bus |
| WFA: | Wi-Fi Alliance |
| WiFi: | A type of WLAN defined by IEEE 802.11 standard, Wi-Fi. |
| WLAN: | Wireless Local Area Network |

Various embodiments provide an efficient protocol and apparatus to wirelessly convey USB datagrams over a WiFi or WiFi Direct link. USB protocol stack is made capable to use as the application framework directly on top of WiFi Direct. According to one embodiment a new protocol, WiFi-based USB, is defined herein, see FIG. 4. The protocol leverages on the existing WiFi or WiFi-Direct for connection establishment, power management, security, and network management, etc. A new Information Element in the Beacon schedules receive and transmit events of the WiFi-based USB nodes (STA), and provides an efficient, contention-free bus-protocol, that provides benefits of the wired USB bus protocol wirelessly.

An upper layer in software can be used as an abstraction layer to connect a WiFi-Direct USB driver to a USB protocol stack. This creates an application framework or adaptation layer on top of WiFi/WiFi-Direct that leverages on the USB protocol stack. In addition, some embodiments improve on the efficiency of the WiFi protocol as well. Among other advantages of various embodiments are:

A. Creates a standard application framework or adaptation layer for WiFi or WiFi-Direct that adds and couples a USB protocol stack to e.g., the WiFi-Direct, or couples WiFi-Direct with an existing USB protocol stack;

B. Minimizes investment in developing and proliferating application protocol stack, by using an existing USB stack;
C. Enables high-data rate and reduced latency communication over the WiFi link.

WiFi-based-USB provides a new Wireless USB protocol on top of 802.11 and WiFi-Direct physical and link layers. The embodiment leverages on WiFi as a mature wireless technology with high data rates, and on proliferation of USB protocol stack and user-experience with wired USB. Some embodiments thus enable a common and standard infrastructure to develop P2P applications. Also, this type of WLAN embodiments offers a USB cable replacement such as between laptops/desktops and CE devices. Thus, wireless hard-drives, printers, web-cams, cameras, game controllers, televisions, laptop computers, cell phones and other internet devices, and other USB compatible wireless devices are provided as system embodiments for enhanced device to device communication.

In FIG. 3, operations in a non-wireless USB 2.0 transaction protocol are depicted as a point of departure. In wired USB 2.0, bus master (Host) operations involve token output and data output, followed by bus slave (USB function) handshake or acknowledge. In the illustration of FIG. 3, subsequent bus master operations involve token output and data input from bus slave into master followed by a handshake or acknowledge from master. Some gaps lie between the signaling rectangles of FIG. 3, and those gaps 190 represent propagation delays plus device turn time.

In FIG. 4, by contrast, the remarkable wireless data transfers by a WiFi-based USB embodiment transparently act as they were mediated by a wired USB 2.0 bus, so to speak, from an internal point of view of other applications that may call upon a WiFi-based USB process embodiment in the master and slave processor embodiments of FIGS. 9-10, 14 and 16. Such latter devices are embodiments that leverage on WiFi and/or WiFi-Direct mechanisms but remarkably create and manage a USB connection wirelessly using back-coupling from an enhanced USB scheduler and stack into the WiFi, for instance. A WiFi-Direct Group Owner (GO) acts as a USB Master or Host for this USB embodiment in wireless form. A WiFi-Direct Client (Device) is made to act as a USB function/Slave wirelessly. More extensive use of native WiFi protocol is thus made possible. A circuitry embodiment as in FIG. 16 acts as a Master or Slave for USB-like operations and the same circuitry unit in the integrated process acts as a AP/Group Owner (GO) or Client (Device) for WiFi/WiFi Direct-like operations. WiFi-based USB is a synergistic integration of process and structure that goes beyond either of wireline USB and WiFi wireless. State machines parse the fields of various types of packets in these processes. The additional MMC_IE 110 is parsed by a suitably-provided additional or modified state machine and process.

In FIG. 4 for one type of a WiFi-based USB embodiment, the MMC_IE 110 includes a special MMC for USB provided as part of an 802.11 information element inserted or situated in the Beacon frame body, see a last (25$^{th}$) row of Table 7-8 allowing space for "vendor specific" information element(s) in the WiFi Beacon frame body in IEEE Std 802.11™-2007, p. 81, and using an information element format according to 802.11 FIG. 7-37 at p. 99. That way, WiFi STAs can remarkably recognize a reserved-number coded MMC_IE 110 to support the special USB-like operations as taught herein.

In FIG. 4, a WiFi-based USB Bus Protocol or process embodiment is depicted. Note the USB-like portions form a bus-type of protocol turned wireless, unlike WLAN's CSMA/CS network protocol but combined with it transparently. This bus-type protocol confers higher efficiency because no medium arbitration or backoffs, or other time-consuming operations are involved. AP/GO/Host schedules Data-Out and Data-In phases for the upcoming Beacon-to-Beacon period BB. The special MMC_IE 110 is transmitted in GO's beacon to inform USB function/slaves (P2P wireless clients) of scheduled Rx/Tx (receive/transmit) USB-like operations expected of them during BB.

Further in FIG. 4, interoperability with CSMA/CA-based WLAN devices can be done by: 1) CTS2Self medium reservation, 2) HCCA, 3) NoA, 4) Separate channels. WiFi-based USB ameliorates interoperability issues that might otherwise arise between distinct wireless systems. Concurrent operation is enabled for WiFi-based-USB Group Owner AP/GO/Host and slave WLAN stations STA, analogous to concurrent WiFi-Direct GO and WLAN stations STA.

For USB-like purposes, the USB host (master) polls the slave devices by sending them signals that ask them one by one whether they have any service requests (also called polling requests herein) signifying that they have USB-like data to transmit. The timing of such polling operations mimics the timing of wired USB even though it is occurring wirelessly. For WiFi-Direct-USB herein, meanings of 'client' depend on the context. 'Client' for USB-like purposes is Host (Master) software that arranges data transfers between a function (USB Slave) and the Master (GO acting as USB-like Host). By contrast, 'Client' for WiFi-Direct-like purposes outside protected medium durations (PDs of FIG. 4) refers to a wireless device in the network other than the Group Owner.

In FIG. 4, polling for USB-like purposes is performed inside the protected medium duration PD(s) remarkably established for USB-like operations inside of the beacon-to-beacon interval BB. Such polling for USB-like purposes is accomplished by activating and executing the part of the USB stack by which the host (Master) polls the slaves for their service requests. In a further remarkable part of the process, the scheduler process provided herein establishes the parameters for, and couples them into, the MMC_IE 110 that is then sent in the next WiFi Direct beacon frame outside any PD(s). That MMC_IE 110 effectively configures the positions and durations of the PD(s) in the next beacon-to-beacon interval BB.

In FIG. 4, Group Owner GO sends a beacon and further incorporates a special information element designated MMC_IE of FIG. 5 therein to schedule stations for USB operations wirelessly. The special MMC_IE 110 sends a field called "Time T1" in FIG. 7 that schedules a particular numbered station STA# in the network. Group Owner transmission includes periodic 100 mS beacons, shown as two beacon frames at either end of FIG. 4. Transmissions by AP/Group Owner acting as USB-like Host are represented by FIG. 2 out-arrows for transmissions OUT in FIG. 4. WiFi device STA transmissions acting as USB-like function or Slave are represented by FIG. 2 in-arrows and legended IN in FIG. 4. For instance, in FIG. 4 "Out #1" means Group Owner sends in a USB-like manner to STA#1. "In #3" means Group Owner receives in a USB-like manner from the sending STA#3. A series of "In" portions like "In #3, In #3, In #3" represents a USB-like burst transmission from STA#3, see detail in FIG. 23. Intervals of Medium Protection, discussed elsewhere herein and designated Protected Medium Durations (PD), bound the USB-like wireless operations in FIG. 4, and those USB-like wireless operations somewhat act like wired USB and resemble FIG. 3 inserted into FIG. 4. Where two or more PDs exist in a BB (Beacon-to-Beacon) interval, the spacing interval between consecutive PDs is designated SI for WiFi or WiFi Direct P2P WLAN communication in each non-USB-like portion of the interval BB between beacons.

Thus, USB-like operations are interposed by AP/Group Owner/Host as scheduled FIG. 4 segments among various WiFi-based operations. For instance, in FIGS. 5 and 7, MMC_IE 110 tells STA#1 to expect USB-like Out from Group Owner to STA#1 at a specified Time T1. Ditto for STA#2. Or, MMC in Group Owner tells STA#3 to transmit USB-like information to Group Owner at the Time T1 applicable to STA#3. Among WiFi Direct-like P2P operations supported in FIGS. 1, 2 and 4, "Rx #5" means Group Owner receives from sending STA#5. "WLAN Rx" is a generalized label meaning "Rx #n." "P2P Tx#6" in the Native P2P/WLAN segment of FIG. 4 involves a transmission from Group Owner to STA #6. After the beacon frame on far right of FIG. 4 starts a next beacon period, the FIG. 4 WiFi-based USB network operations start all over again in a continuing and then applicable manner including an updated MMC_IE therein. The Master may acknowledge (ACK) reception from Slaves in the previous beacon period.

In FIG. 7, relevant packet fields that MMC_IE 110 sends out are illustrated, to support WiFi-based USB-like operations of the embodiments. There, a format 110 of the MMC_IE (Information Element) is shown and specifies the USB-like operations of FIGS. 2 and 6, and does not specify the other native WiFi or WiFi Direct operations of FIG. 2. MMC_IE 110 commences with a particular MMC_IE identification ID Code and an MMC_IE Length field. Thereafter, MMC IE has a set of records each including fields that, in the illustrated order, are suitably coded to represent 1) a Slave address (WiFi STA#) for WiFi-based USB-like purposes, 2) a Transaction type and direction (e.g., Data Out/In), 3) a start Time T1 relative to the Beacon signal start, and 4) a transaction duration D1 beginning from the start Time T1. The number of records in the MMC_IE is established by the various operations that the WiFi AP-based USB Host/Master determines. For instance, in FIG. 7, the records are as follows:

[#1, Data Out, 2100 uS, 900 uS]
[#2, Data Out, 3200 uS, 600 uS]
[#3, Data In, 3900 uS, 1500 uS]
[#1, Data Out, 55 mS, 900 uS]
[#2, Data In, 56 mS, 700 uS].

The MMC_IE 110 for FIGS. 4, 5, 7 and 21 is created by any suitably-effective enhanced scheduling process embodiment that facilitates synergistic cooperation of WiFi or WiFi Direct process and the wireless serial USB-like process. The MMC_IE 110 thus includes records specifying the USB-like operations inserted at time positions inside the interval BB from beacon frame end to next beacon frame start. Suppose a data transfer is predictively computed by Timetotal=FileSize/Rate to take a long time (more than about 100 mS beacon periodicity) to complete. The scheduling process splits up the data transfer. Notice that the Rate is, or is based on, the available wireless medium bandwidth between AP/GO/Host and a Slave STA as established by a wireless networking module such as in the WiFi stack 332 of FIG. 10. The Rate is based on or related to the 802.11 'SupportedRate' in the WiFi MLME or otherwise appropriately determined by the networking module.

Besides the Data transfers (Data In, Data Out) explicitly entered in the FIG. 7 illustration, other kinds of information transfers are or can be specified in the MMC_IE 110 of FIG. 7. Some embodiments encourage USB2.0 transparency by supporting all data-types defined by the wired version USB2.0 spec, section 4.7. Such a WiFi-based USB embodiment comprehends four basic types of data transfers: 1) Control Transfers: Used to configure a device at attach time and can be used for other device-specific purposes, including control of other pipes on the device. 2) Bulk Data Transfers: Generated or consumed in relatively large and bursty quantities and have wide dynamic latitude in transmission constraints. 3) Interrupt Data Transfers: Used for timely but reliable delivery of data, for example, characters or coordinates with human-perceptible echo or feedback response characteristics. 4) Isochronous Data Transfers: Streaming real time transfers that occupy a pre-negotiated amount of USB bandwidth with a pre-negotiated delivery latency. The applicable code for each transfer is entered in place of "Data" in the Type column of the FIG. 7 corresponding row for that transfer.

Some embodiments maintain a star topology approach for USB-like operations and benefit from and can leverage upon deployments of legacy USB protocol stacks. In such embodiments, the WLAN Beacon sent by the Master includes fields that identify the Master. So there is no need for additional identification of the Master in the MMC_IE. Thus, in FIG. 7, if a WiFi-based USB-like link is scheduled between the master and a slave station, the Master station STA # is not specified to identify the Master in the row of MMC_IE 110 scheduling the access, although such additional identification of the Master in the MMC_IE could be provided. Accordingly, all data transfers specified by MMC_IE 110 in FIG. 7 are between the tabulated STA# as a slave and the WiFi Direct GO as USB untabulated master. This type of WiFi-based USB embodiment enumerates only slaves with unique ID numbers to communicate with a single master station in a star topology for the WiFi-based USB-like operations, while maintaining P2P functionality in non-star topology in their WiFi Direct non-USB-like operations.

Figures 8, 9:
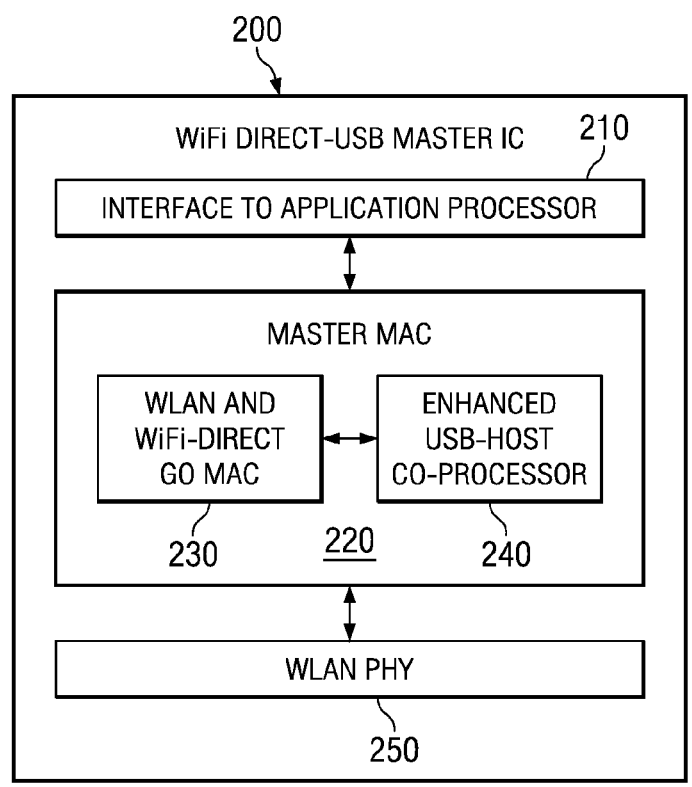
FIG. 8 is a composite detail of respective portions of the inventive WiFi-based USB MMC_IE of FIG. 7 extracted by inventive Slave processes for corresponding slave scheduling.
FIG. 9 is a block diagram of an inventive Master integrated circuit (IC) chip for inventive WiFi-based USB operation according to the inventive processes of FIGS. 10, 11 and 13.

In FIG. 8, each slave station STA#i selects and parses the rows intended for it in MMC_IE 110 of FIG. 7. Such rows of FIG. 7 commence with that STA#i entry and terminate just before a next-subsequent STA# entry. FIG. 8 shows respective portions 121, 122, 123 of the inventive WiFi-based USB MMC_IE 110 of FIG. 7 extracted by inventive Slave processes for STA 1, STA 2, STA 3 for corresponding slave scheduling. For instance, STA 1 selects only the two rows intended for it, and STA 1 schedule portion 121 then represents Data Out transactions starting respectively at 2100 uS and 55,000 uS. STA 2 selects only the two rows for Data Out and Data In of MMC_IE 110 intended for STA 2 and provides them internally in STA 2 as schedule portion 122. STA 3 selects only the single row for Data In intended for STA 3 and provides it internally in STA 3 as schedule portion 123. Further in the particular example of FIGS. 2, 6 and 7, each of STA 4, STA 5, and STA 6 parse the MMC_IE 110 of FIG. 7 but their parsing processes detect and extract no row of information because their STA# is not addressed in MMC_IE 110. Accordingly, the stations STA 4, STA 5, and STA 6 produce a null control signal (not shown but would be given numerals 124, 125, or 126) and do not participate in any USB-like data transfers in the particular beacon-to-beacon interval illustrated in FIG. 4.

Using FIG. 8, various embodiments further parse each such row of MMC_IE information intended for that given STA# by responding to the TYPE information too. For example, if MMC_IE rows involving different types of scheduling are addressed to a station, say slave STA #2, then rows for CTL (control) operations are used by slave STA#2 to schedule the slave process 530 for sending a service request in FIG. 12, while the rows for DATA transfers are used by slave STA#2 to schedule the slave process 840 of data transfer FIG. 15.

Figure 14:
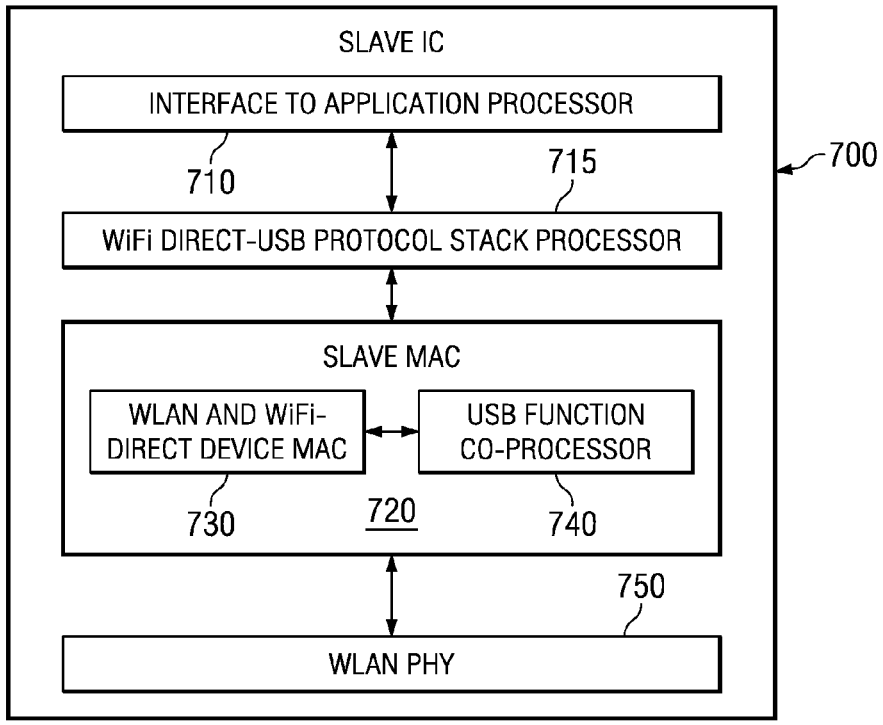
FIG. 14 is a block diagram of an inventive Slave integrated circuit (IC) chip for inventive WiFi-based USB operation according to the inventive processes of FIGS. 12 and 15.

In FIG. 9 and FIG. 14, embodiments of integrated circuit (IC) chips are provided as a WiFi-based USB 2.0 IC, a Slave WiFi-based USB IC, a WLAN PHY 40 MHz SISO, 2×2 20 MHz MIMO (e.g., for mobile handset markets)+2×2 40 MHz MIMO—for other connectivity markets. Further embodiments include a WLAN and WiFi-Direct MAC, and a WiFi-based USB MAC co-processor, e.g., to handle WiFi-based USB protocol, and end-points buffers. Host software (SW) provides WiFi-based-USB 2.0 as a USB adapter or adaptation layer.

FIG. 9 shows a hardware diagram of one IC chip embodiment. In FIG. 9, at a high-level, a Master integrated circuit (IC) 200 includes an interface 210 for coupling a system application processor MPU of a laptop or other particular consumer device of FIGS. 1-2 to a Master Media Access Controller MAC 220. Master MAC 220 includes a wireless networking WLAN MAC circuit (or processor core) 230 for operation as an 802.11 WLAN and/or WiFi Direct Group Owner. Further, a coprocessor circuit or core 240 is operative as an enhanced USB Host. Coprocessor 240 provides USB operations of FIG. 2 and is coupled and operates in an inter-related manner with MAC circuit 230 to construct that part of the signal stream of FIG. 4 that is to be transmitted by the AP/Go/Host as master. A WLAN PHY 250 provides a physical layer circuit coupled with Master MAC 220 that actually generates the RF wireless signals including Master's portion of the signal stream of FIG. 4 as modulation and feeds them to WLAN antenna(s) of the Master. PHY 250 also includes a WLAN receiver to receive RF wireless signals from the WiFi devices including USB functions/Slaves and feed them to the Master MAC 220 and other circuits of FIG. 9 to respond appropriately.

Figure 10:
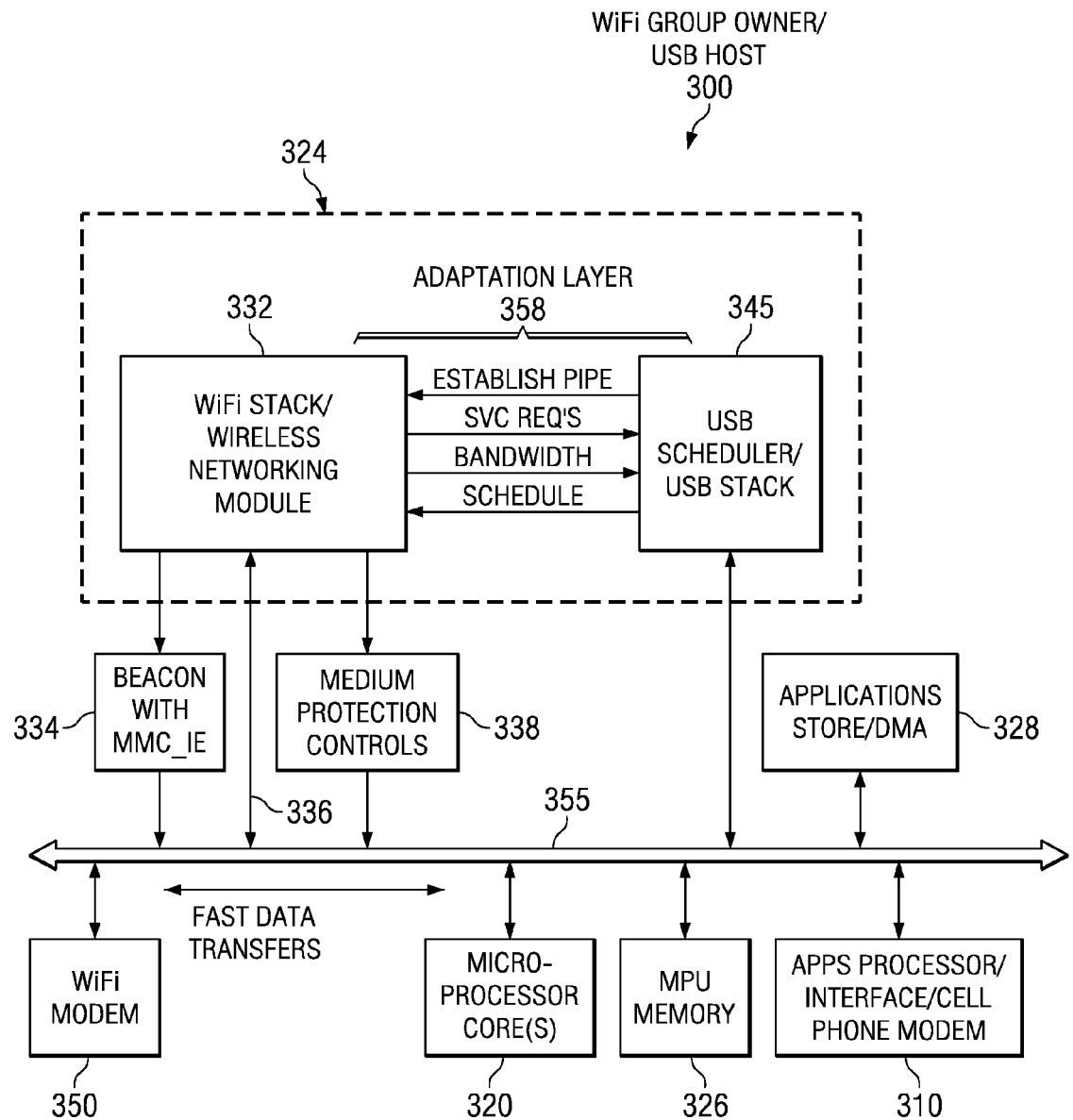
FIG. 10 is a partially-block, partially-flow diagram of an inventive Master integrated circuit (IC) chip for inventive WiFi-based USB operation according to inventive processes of the FIG. 10, FIG. 11, and FIG. 13 flows.
Figure 11:
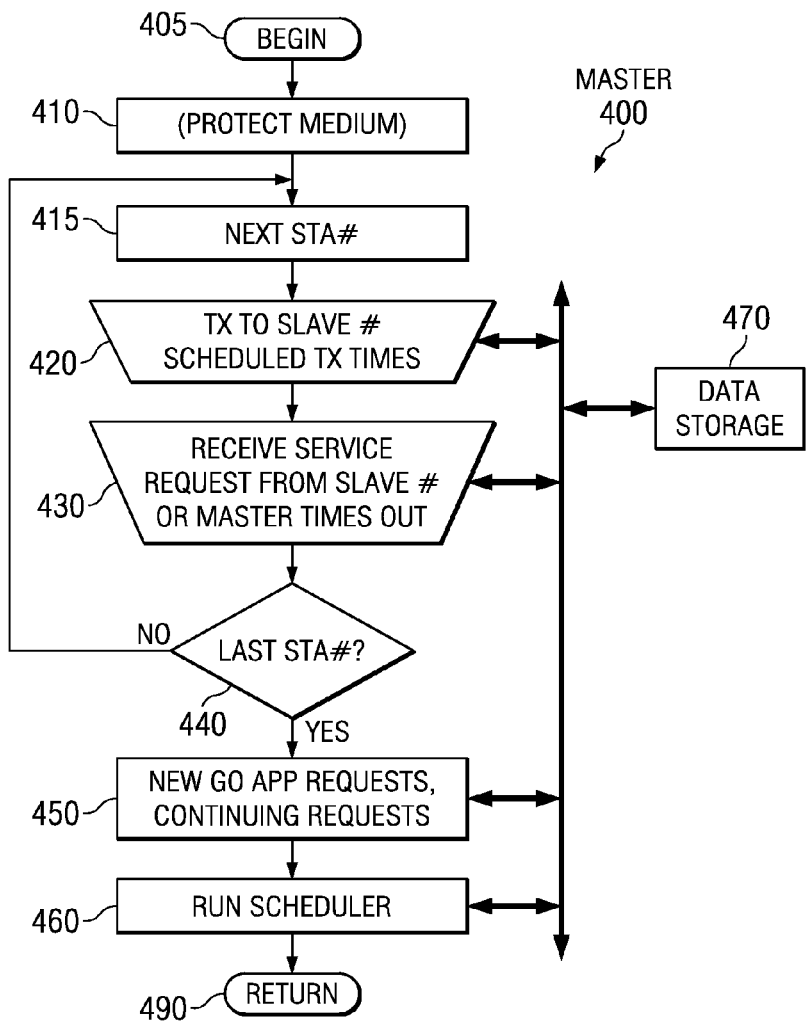
FIG. 11 is a flow diagram of a pipe establishment and polling sub-process for obtaining slave service requests for inventive WiFi-based USB in the inventive Master integrated circuit (IC) chip in FIGS. 9-10 and for inventive master mode in FIG. 16.
Figure 13:
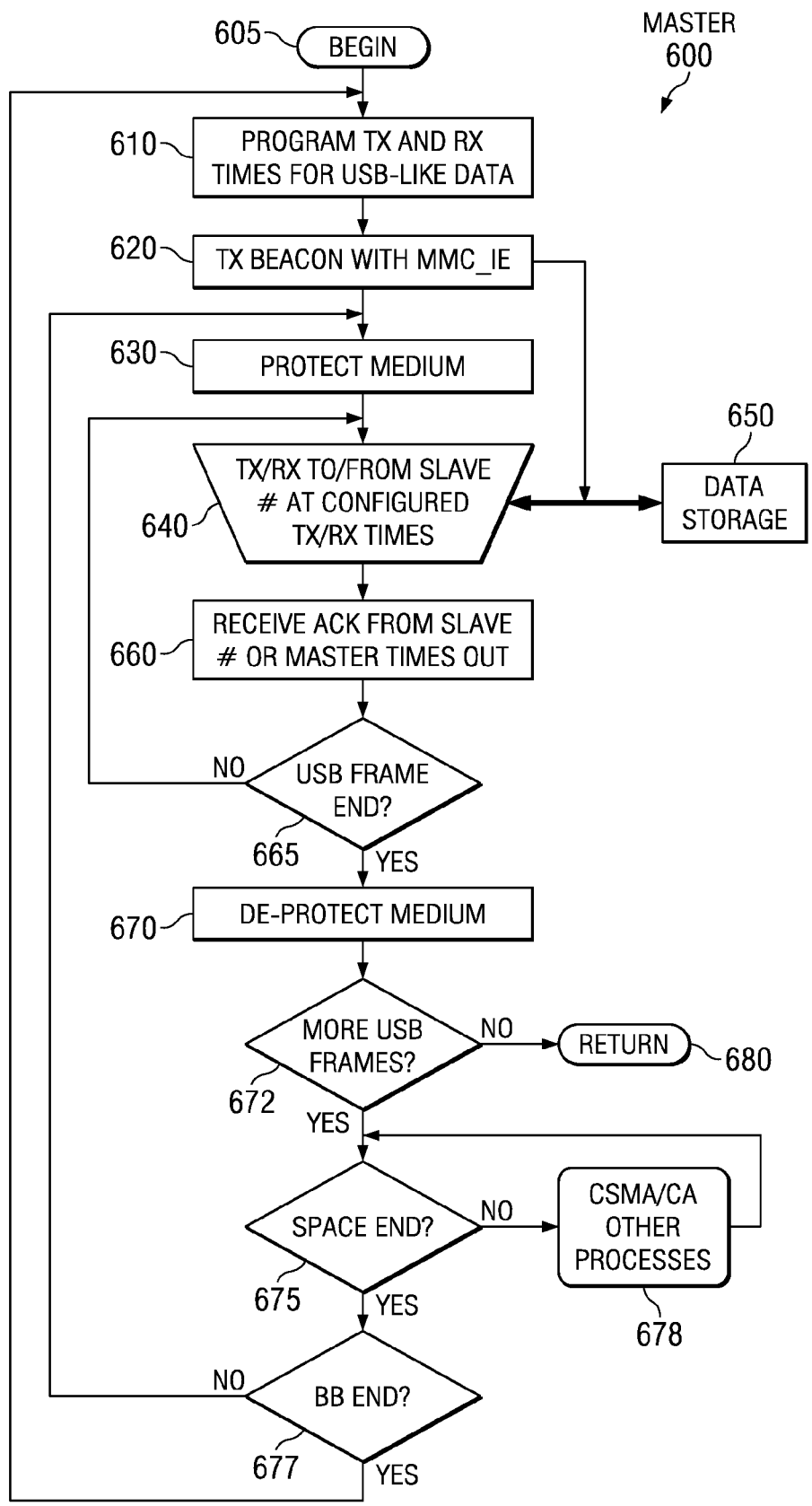
FIG. 13 is a flow diagram of an inventive mastering process for inventive WiFi-based USB in the inventive Master integrated circuit (IC) chip in each of FIGS. 9-10 and inventive Master mode in FIG. 16.

In FIG. 10, a Master integrated circuit (IC) chip 300 has WiFi-based USB for operation according to process embodiments of FIG. 10, FIG. 11, and FIG. 13 flows. In FIG. 10, a Master integrated circuit 300 embodiment has a structure somewhat like that of Master IC 200 of FIG. 9 and detailing further structures and processes. Middle digits in the enumeration in FIG. 10 are provided in a manner to facilitate comparison with FIG. 9. Master 300 has an interface 310 to an external applications processor, which may also have a cell phone modem. Microprocessor core(s) 320 are coupled with a flash memory or other nonvolatile storage 324, local microprocessor memory 326, and a storage for applications 328 along with DMA (Direct Memory Access) control. Flash memory 324 is loaded with a WiFi stack 332 with an enhanced wireless networking module, and a USB stack 345 with an enhanced USB scheduler. The enhancements form an adaptation layer 358. The microprocessor 320 executes instructions and utilizes configuration and other information in flash memory 324 to perform and instantiate structure and process embodiments for WiFi-based USB and WiFi Direct-USB as detailed herein. Microprocessor 320 is coupled via a bus 355 to a WiFi modem 350.

In FIG. 10, the flash memory storage 324 has wireless networking module in WiFi stack 332, adaptation layer 358, and enhanced scheduler module for USB stack 345. The processor MPU 320 operates in accordance with the wireless networking module in stack 332 to determine available wireless medium bandwidth. The enhanced scheduler module for USB stack 345 responds to A) one or more service requests via the modem, and B) the available wireless medium bandwidth from the wireless networking module, to establish a schedule for USB-like operations. The processor 320 operating by the wireless networking module is responsive to the scheduler module of stack 345 to 1) introduce into the beacon 334 an information element MMC_IE 110 having a schedule for inter-beacon USB-like operations for transmission via the modem 350, and 2) perform a wireless networking procedure to deliver medium protection controls 338 to protect the wireless medium for USB-like operations during time durations (PDs) piecewise encompassing the schedule thus introduced.

The processor 320 is operable with the modem 350 to establish and actualize each such protected medium duration PD by a process selected from any of: 1) HCCA, 2) CTS2Self, 3) NoA, 4) other applicable medium protection process.

Thus, the special improvements provide an adaptation layer 358 that remarkably reaches into and enhances the protocol level of WiFi and USB for high data transfer efficiency. In this way, multiple devices STA in the wireless network of FIG. 2 requesting USB service are pre-allocated or pre-scheduled and thus do not compete, as believed the case hitherto, for use of the times, wireless medium or space and frequencies by which they communicate. The time taken up by the electronic process of CSMA/CA collision avoidance, and arbitrating about which device STA will be using the medium at any given time, is obviated and no longer constrains the speed or bandwidth of this type of network for fast transfer of streaming data and large files in a USB-like manner. It is believed that, for some embodiments and service requests, the bandwidth improvement may be as much as 15% or more. Not only does WiFi have some power savings features, but WiFi Direct introduces even more effective, extensive and enhanced power savings features along with enhanced peer-to-peer networking features as discussed in connection with FIG. 20 and FIG. 21 among other Figures herein. And WiFi Direct is also suitably extended and enhanced with the adaptation layer for USB-like operations in WiFi Direct.

In FIG. 10, the WiFi-based USB master reads the link requirements of the device (required bandwidth, latency, etc.) in a Pipe Establishment phase, defined in the USB 2.0 spec (refer to USB 2.0 spec section 5.3). Following that, the master's scheduler polls the function/slave device periodically, according to the periodicity requested by the device in the establishment phase, by allocating time in the MMC_IE for the device to send data to the master. Data-polling periods may likely be tens of milliseconds, e.g. 20 mS, from start of one PD to start of another PD depending on scheduler results.

WiFi modem 350 and microprocessor 320 operating in accordance with the wireless networking module deliver service requests SVC REQ's including configuration data for USB pipe establishment in accordance with the instructions of the USB stack 345. Upon initial device connection to the network and subsequently possibly as needed, the USB stack 345 issues controls to wirelessly establish a USB-like 'pipe' analogous to a 'pipe' in wired USB. Microprocessor 320 using WiFi modem 350 generates available bandwidth information using the instructions of the wireless networking module, and sends BANDWIDTH (also designated data rate R) to the USB scheduler 345. WiFi modem 350 receives service requests, such as IRP's (Input/Output Request Packets) from WiFi network stations STA, and data transfer requests from applications executed out of applications store 328, and delivers them to the enhanced USB scheduler. The enhanced USB scheduler uses the BANDWIDTH (R) and service request SVC REQ's information to generate a Schedule of USB-like operations for USB 'pipes' in the succeeding beacon-to-beacon period by the master 300 and slave stations in the wireless network of FIG. 2. The Schedule is used to form a latest MMC_IE 110 in FIGS. 5, 7 and 10, and a next beacon 334 is sent with that latest MMC_IE 110 for transmission by WiFi modem 350. (Notice that the beacon 334 and the medium protection controls 338 do not necessarily physically emanate from the flash memory 324 itself but rather from the microprocessor 320 operating in accordance with its instructions. However, for operational clarity of illustration, the beacon 334 and medium protection controls 338 are diagrammatically associated with the wireless networking module 332.)

During the protected medium durations (PDs) that the microprocessor 320 establishes by generating the medium protection controls 338, and in accordance with packet formats structured by the USB stack 345, the microprocessor 320 executes fast data transfers in tandem with WiFi modem 350. WiFi modem 350 transmits or receives the fast data transfers, which are then delivered to the memory 326 and/or applications processor interface 310. For one example, isochronous streaming data then are fed for rendering and video/audio content is enjoyed by user.

Further regarding the enhanced USB scheduler according to the FIG. 10 adaptation layer, the following are some applicable scheduling constraints:

1) Sum of protected medium durations PDs<Time BB between beacons.
2) Sum of protected medium durations PDs>=function of (sum of bandwidth allocation [Mbps], WLAN data rate [Mbps]). An inequality stated in comparable units is:

Sum of protected medium durations PDs>=100 mS×
(sum of bandwidth allocation [Mbps]/WLAN
data rate $R$ [Mbps]).

3) Number of PDs in a beacon period>=Time between beacons/max allowed latency per WiFi-based USB link.
4) Time between PDs in a beacon period<=max allowed latency among all wireless STA links.
5) Duration of each PD<=max allowed PD duration (dynamic parameter)
6) Spacing Tspace (PD+SI here) between PDs>=min allowed spacing (dynamic parameter).
7) PD>Sum of durations D1 scheduled within PD.

The process by which a long data transfer is split up is detailed next. Suppose a data transfer is predictively computed by Timetotal=FileSize/Rate to take a long time (greater than about 100 mS beacon periodicity) to complete. Assume that: A) WiFi-based USB Device's required USB data-rate=LINK_DATA_RATE parameter value. B) WiFi-based USB Master has maximal USB-like period (out of the total beacon period)=MAX_USB_PERIOD (e.g., 20 msec). C) Assume the file transfer is the single link. Then, in each beacon period the amount of data that will be transferred is: MAX_USB_PERIOD×LINK_DATA_RATE (Mbps). This amount is suitably transferred in a single period PD just following the every Beacon, until the file has been transferred. If there are other USB-like links that have been established, the enhanced USB scheduler will split MAX_USB_PERIOD between the links in a fair way that will respect their QoS requirements.

For the enhanced USB scheduler of FIG. 10, notice from FIG. 4 that some maximum Tmax for a protected-medium duration PD is contemplated, along with a minimum spacing interval SI, and a minimum spacing Tspace=(PD+SI) between them for long data transfers. Spacing Tspace is used to address applications that have maximal (shortest) latency Max_Latency parameter less than the 100 msec beacon-to-beacon interval. In such case of short latency, multiple USB-like operation periods are scheduled within every beacon-to-beacon interval, spaced with Tspace at least as short as (<=) Max_Latency from each other. Also, for long data transfers, scheduler may also split or space the data by SI between more than one USB-like operational period, i.e., protected-medium duration PD, in order to avoid a continued or unduly extended possession of the wireless medium by the USB-like process part of the embodiment that might otherwise impact latency requirements of regular WiFi (other non-USB-like) users in the WiFi or WiFi Direct system of FIGS. 1-2.

Data transfers longer than the Beacon periodicity (e.g., 100 mS) are permitted and are spaced out over plural or several beacon periods. Number of PDs to transfer the file is equal to the first integer greater than: Time total/Tmax. The maximum number (designated NrPDBB herein) of PDs (between successive beacons BB) is about equal to the first integer less than 100 mS/(Tmax+SImin). For example, if Tmax=10 mS and SI=10 mS, then NrPDBB=100 mS/20 mS=5. An approximate value (or feasible range for it) contemplated for the maximum protected-medium duration PD<=Tmax depends on the use-case. For example, if no other networks are currently sharing WiFi activity on the same channel with the WiFi-based USB network, then Tmax=~100 mS beacon-to-beacon interval BB enables maximal WiFi-based USB throughput. If at least another network is on the same channel, a reasonable Tmax is 20 msec. Thus, a conditional or dynamic determination of Tmax depending on whether at least another WiFi Direct network is currently sharing activity on the same channel is suitably electronically implemented in some embodiments in software or hardware.

In FIG. 10, suppose the Master schedules no USB-like transmissions to occur to/from any station in a given beacon-to-beacon interval BB. In some embodiments, the master sends a Null MMC in its beacon that includes only a FIG. 7 MMC_IE header with an empty data field. Conversely, suppose internal Master applications and/or polling of Slaves indicates USB-like transmissions to/from some station(s) are needed for service in a given beacon-to-beacon interval. Scheduling for a FIG. 7 MMC_IE 110 in general proceeds to assign USB-like support for multiple stations with different QoS requirements and file lengths calling for USB-like support for a same beacon-to-beacon period as discussed next.

In another scheduling example, assume two links—one link for data transfer at 10 Mbps rate (e.g., file transfer), and the other link (e.g., a game controller) with maximal (shortest) latency requirement of 20 mS with 100 Kbps data rate. Assume WLAN effective rate Bandwidth R is 20 Mbps, and Tmax=20 msec. The scheduler proceeds to assign five (5) PDs in between 100 mS beacon periods of 10.1 msec each:

(10+0.1 Mbps)/20 Mbps*100 msec/5 periods=10.1
msec.

In each period the first 0.1 msec is allocated for the gaming application, and the other 10 msec for the file transfer. Note that the WiFi-based USB allocation may actually be made somewhat larger to account for overheads.

In FIGS. 4 and 7, consider operations occurring when the spacing interval SI is between two USB-like schedule-row operations. The first protected interval PD elapses, whence a decision operation or PD timeout de-protects the medium. Then spacing interval SI elapses, and then later at 55 mS the system resumes protection with a new PD.

In FIG. 10, the WiFi-based USB embodiment alters WLAN's medium access scheme (CSMA/CA) by an operation 338 to protect the medium so that Slave devices for USB-like purposes do not have to compete with other devices in the network, and instead are assigned predetermined times specified in the beacon's MMC_IE in which they can access the medium. Other WLAN stations in the network that lack a WiFi-Direct-USB slave process (e.g., of FIG. 15) may not be able to interpret the MMC_IE 110, and hence may attempt to access the medium while USB-like operations are ongoing. To avoid this potential contention, periods specified for Master/Slave transactions are suitably protected in any of several alternative ways or some combination thereof:

1) HCCA for PDs: Under control of the enhanced USB scheduler through the application layer 358 herein, AP/GO/Host uses the Hybrid coordination function (HCF) controlled channel access (HCCA)—a medium access scheme specified in the 802.11-2007 spec, see sections 9.1.3.2, 9.9.2 and 9.9.2.1. Under HCCA, stations do not compete for medium access, but rely on the AP to poll them regularly. The WiFi AP suitably uses HCCA, under control of the USB scheduler when USB-like operations are to be protected, to allocate transmission opportunities (TXOPs) with specified duration to non-AP STA's. When the adaptation layer 358 herein of an embodiment establishes such a specified duration for USB-like transactions, the specified duration is called a protected medium duration (PD) herein. Since HCCA is part of basic WiFi, HCCA is usefully employed in WiFi-based USB embodiments whether or not they have WiFi Direct functionality. The PD for USB-like purposes herein is specified and transmitted by AP/Host, e.g. in a WiFi QoS (+) CF-Poll Frame (see definition in 802.11 spec section 7.1.1). That Poll Frame is addressed to each same non-AP STA (a slave station herein) as is identified in the MMC_IE, for coordination, and the Slaves respond in their scheduled times for USB-like operations. Other non-AP STA's that are not addressed respond to that Poll Frame by preventing contending transmissions from themselves during the PD, and in that way the medium is protected.

2) CTS to itself: Under control of the enhanced USB scheduler through the application layer 358 herein, GO sends packets called Clear to Send (CTS) that inform stations STA in the network that the medium is NAV protected for a transmission opportunity (TXOP) for a specific duration, in which they are not allowed to access the medium. The CTS frame can be sent under HCCA or separately. Such frames used for USB-like purposes herein are also called CTS2Self herein. The CTS frame format includes a duration field and the format is provided in 802.11 spec p. 73, section 7.2.1.2.

3) Notice of Absence (NoA): Under control of the enhanced USB scheduler through the application layer 358 herein, GO sends a WiFi-Direct frame called NoA that notifies all WiFi-Direct devices in the network that (or, as if) the GO will not be available for a specific duration. WiFi-Direct devices that are not involved in WiFi-Direct-USB transactions will not attempt to access the medium during this time. See WiFi Direct spec. pp. 59-65, 89-91, 109-110. In its beacon frame, Group Owner (GO) sends a P2P Notice of Absence attribute including the absence schedule. Adaptation layer 358 provides a schedule of PDs for USB-like operations for inclusion into the absence schedule. For instance, GO sends Notice of Absence schedule in the GO beacon to ostensibly prevent transmissions from all the stations STA during PDs, and then during the PDs, GO engages the Slaves according to the scheduled USB-like transmissions between GO and the particular slave stations that have been notified via MMC_IE USB-like traffic. Because of the notification in MMC_IE and their own Adaptation Layer herein in FIG. 8 and FIG. 18, GO and the slave stations respond appropriately notwithstanding and also benefit from medium protection established by the NoA. Note that non-USB-like WiFi Direct power saving, channel scanning or other functions may already or additionally be included elsewhere in the GO's absence schedule.

Some embodiments use only one of the above methods HCCA, CTS2Self, NoA. Other embodiments combine these different ways statically or dynamically, such as by using one of the methods only for protecting outgoing transmissions from the Group Owner, and another one of the methods only for protecting incoming transmissions from Slaves to the Group Owner. For supporting such WiFi-based USB-like embodiments, the choice of method(s) is suitably based on whether WiFi or WiFi Direct is involved, and which method leads to the simplest Adaptation Layer 358 implementation or otherwise confers advantage that best accords with particular design criteria. Also, in some embodiments Group Owner suitably sends a P2P Notice of Absence action frame directly to each P2P client that is not involved in a USB-like operation instead of, or supplementing, a Notice of Absence attribute in the beacon.

Various embodiments of slave stations STA respond to those portions in FIG. 8 of the MMC_IE addressed specifically to any given one of them. During a PD, and at each scheduled Time T1 for the corresponding scheduled interval in FIG. 8, such an addressed slave station performs USB-like operations independently of, substituting for, or overriding medium protection controls therein that would otherwise be effectuated if the MMC_IE had not addressed that station as to that Time T1 and scheduled interval of FIG. 8. Concurrently, all power saving operations proceed in the various stations in the network to the extent such power saving operations can be performed in a manner not consistent with the USB-like operations. In this way both the benefits of USB-like operations herein, as well as the benefits of power saving in WiFi and enhanced power saving in WiFi Direct, are realized.

Different embodiments can be structured regarding the protection and de-protection in alternative ways. Some embodiments use a protection counter timeout so de-protect is implicit—e.g., the medium is de-protected when its PD time-duration, such as in a CTS2Self frame sent by the GO, expires. Some other embodiments employ a decision criterion to initiate de-protection, such as T1−(T1 previous+duration)>Threshold. The gaps between USB transfers within a protected duration are desirably made short. A reasonable value for the threshold is several hundred microseconds, such as 500 uS. Example: In FIG. 7 MMC table, the gaps between end times and succeeding start times are 3200−(2100+900)=200; 3900−(3200+600)=100; 55000−(3900+1500)=49600; 56000−(55000+900)=100 microseconds. The USB transfers inside a PD are thus compactly scheduled to be no more than about 500 uS apart from one to the next. The protected-medium durations PD (if two or more) are desirably spaced, separated, or made at least several milliseconds apart (e.g., SI about 10 mS apart) to permit non-USB-like WiFi-Direct transactions. Thus, some such minimum time interval value likely in milliseconds between USB-like protected-medium durations PD of FIG. 4 is introduced to permit useful WiFi-Direct operations in such interval. Still other embodiments combine various criteria.

Firmware in the Master of FIG. 9, or of FIG. 16 Master/Slave in master mode, programs the FIG. 7 MMC_IE values for the Time T1 to satisfy practical scheduling constraints noted hereinabove and such as: 1) All start times T1 are between beacons. 2) All end times T1+D1 are prior to next succeeding start time T1, and last end time is still between beacons. 3) All start-end intervals for USB-like data transfers are compactly grouped together into at least one protected-medium duration PD to avoid small spaces SI<SImin that WiFi-Direct would otherwise have hard time filling with useful operations.

Some embodiments allocate a total time for USB-like transfers by applying screening tiers (such as represented by a CASE statement), so if total USB-like time needed is less than a Thresh1 (e.g., 2 mS), then provide one protected-medium duration, else if less than a larger Thresh2 (e.g., 4 mS), then provide two protected-medium durations as in FIG.

4, else . . . three . . . durations, etc. If two or more protected-medium durations PDs are called for, then the scheduling process embodiment distributes them about evenly over the interval between beacons to allow WiFi-Direct-like ops in most parts of the interval between beacons. For instance, if N=2 protected-medium durations and no QoS constraint, then put the first one within a few milliseconds of the beacon, and the second one around 50 mS from beacon. If N=3 protected-medium durations instead, then put the first one within a few milliseconds of the beacon, and the second one around 33 mS from beacon, and the third one about 67 mS from beacon. Divide up as 100 ms(i/N) (i=0, 1, . . . N−1)mS.

In FIG. 10, the GO/Host Master is provided with an enhanced scheduler process embodiment that schedules the time entries of FIG. 7 MMC_IE 110 as its output in the Beacon. The scheduler process operates in a way that satisfies the Quality of Service requirements of the links to the Slave connected to it, and in a way that makes medium usage effective. Notice that since the interval BB between beacons is under but about 100 mS, the choices of when to schedule protected-medium durations PDs for USB-like transfers can affect latency for those USB-like transfers and thus QoS. The scheduler process programs the scheduling to satisfy latency constraints. As multiple protected-medium durations for USB-like operations are allowed within a beacon-to-beacon interval (~100 mS), the scheduler process has the ability to control the latency if the Quality of Service requirements are for latency shorter than inter-beacon time.

For instance, if the maximum latency for voice is 20 msec, the scheduler process schedules a series of protected-medium durations PD that starts in time to encompass a voice data transfer between Master and a specified Slave STA# i every 20 msec. The scheduling of information transfer periods inside the inter-beacon interval is thus aligned to the QoS requirements of each link. For another example, if one of the devices is a computer mouse that should be sampled every 30 msec to ensure good user-experience, then protected-medium durations and data transfers are scheduled in the WiFi-Direct-USB Master at least every 30 msec in which the mouse gets an opportunity to report its current position. If for some reason the QoS requirement changes, e.g. there is a need to sample the mouse position every 15 msec, the mouse will ask to change its QoS parameters, and they become effective starting from the next Beacon (i.e., after 100 msec). This delay in adapting QoS parameters is typically not an issue for most applications, as adaptation is called for and happens once over a long time and only sporadically, and has low effect on user-experience.

Thus, even though requests for USB-like transfers may arise from applications in the master or slave processors within the 100 mS interval between beacons after the first beacon, they are scheduled for action in the MMC_IE 110 in the next beacon. The Master periodically polls the slave, so if the slave is the unit that wants to initiate a USB-like data transfer, the slave is polled and thereby informs the master, and the master schedules the transfer as soon as possible in the next MMC_IE. Some transparency embodiments are arranged for parallelism with wired USB2.0 spec, such as sections: 4.7.5, 5.3 and 5.3.1, so that each slave has one or more endpoints. Each endpoint has a description of its communication QoS requirements (bandwidth, latency, etc). These QoS parameter values are input to a scheduler process embodiment in the Master from all requesting applications in Master and requesting Slaves, and any QoS parameter values carried over from data transfers that are in progress and still need to complete. The scheduler process reconciles the various requests and fills the MMC_IE 110 of FIG. 7 with appropriate scheduling entries identifying the various STA#, transfer types, start times, and durations. A requested amount of bandwidth for a communication is imparted or fulfilled by the Master by allocating a sufficient total amount Ti of the transaction times D1 represented in the rightmost column of FIG. 7 for a given station STA # i. At a given instantaneous wireless data rate R, the bandwidth effectively allocated to STA # i is BW=R×Ti/100 mS. A requested low amount of latency for communication with a given station STA # i is fulfilled by the Master by scheduling start Times T1 in the fourth column of FIG. 7 for that station STA# i spaced apart no more than the latency interval.

For a numerical example, suppose the available instantaneous wireless data rate between master and all the stations is 1 Mbps. From polling the Slaves, the Master has the following TABLE 2 requests stated In/Out from the viewpoint of the Master:

TABLE 2

POLLING DATA

| Station | Transfer | Direction | Latency | Bandwidth |
|---|---|---|---|---|
| STA #1 | Data | In | 20 ms | 20 Kbps |
| STA #2 | Data | In | 30 ms | 50 Kbps |
| STA #3 | Data | Out | 100 ms | 300 Kbps |

Let the parameters of the Master allow first USB-like transmission no sooner than 3 ms after Beacon start, minimum spacing 10 ms, maximum 15 ms of protected medium duration PD. Based on this information, the scheduler process in the Master reconciles all the requests and issues MMC_IE 110 of TABLE 4. Latency L is used to electronically derive number of PDs for a STA# according to NrPDBB=⌈100 mS/L⌉, i.e. first integer greater than or equal to the 100 mS inter-beacon interval divided by the latency L. The TABLE 3 Duration values are then found by scheduler electronically solving for $\Delta t$ in the bandwidth equation: NrPDBB×$\Delta t$×1000 Kbps/100 mS=BW, where bandwidth is a value from TABLE 2 as requested by a given STA # i. The scheduler process then sets start times (e.g., 3, 23, 41.4, 61, 83) for the lowest latency called for, then sets start times for the next-lowest latency (30, 61.4, 83.5) etc. For the 100 mS latency transfer, that time is allocated on the end of a previous transfer in same PD until any the first-to-occur of the following happens: 1) the 15 mS maximum PD is used up, or 2) the 10 mS minimum spacing to the next PD is reached, or 3) the total time (NrPDBB×$\Delta t$) is used up, whichever comes first. If multiple 100 mS latency, volume transfers are requested, they are fulfilled in each PD in the proportion of their total times (NrPDBB×$\Delta t$). The scheduler is permitted +/−2 mS of accuracy in fulfilling latency here, which is believed quite acceptable. It will be understood that various scheduling methods can be used in various embodiments.

TABLE 3

SOLUTION MMC_IE FOR TABLE 2 DATA

| Station | Transfer | Direction | Start | Duration |
|---|---|---|---|---|
| STA #1 | Data | In | 3 ms | 400 uS |
| STA #1 | Data | In | 23 ms | 400 uS |
| STA #1 | Data | In | 41.4 ms | 400 uS |
| STA #1 | Data | In | 61.0 ms | 400 uS |
| STA #1 | Data | In | 83 ms | 400 uS |
| STA #2 | Data | In | 3.5 ms | 1250 uS |
| STA #2 | Data | In | 30.0 ms | 1250 uS |

TABLE 3-continued

SOLUTION MMC_IE FOR TABLE 2 DATA

| Station | Transfer | Direction | Start | Duration |
|---|---|---|---|---|
| STA #2 | Data | In | 61.4 ms | 1250 uS |
| STA #2 | Data | In | 83.5 ms | 1250 uS |
| STA #3 | Data | Out | 4.9 mS | 5.0 mS |
| STA #3 | Data | Out | 23.5 mS | 6.4 mS |
| STA #3 | Data | Out | 42.0 mS | 8.0 mS |
| STA #3 | Data | Out | 62.8 mS | 6.0 mS |
| STA #3 | Data | Out | 84.9 mS | 4.6 mS |

Some further description of FIG. 10 is provided later hereinbelow.

Figure 12:
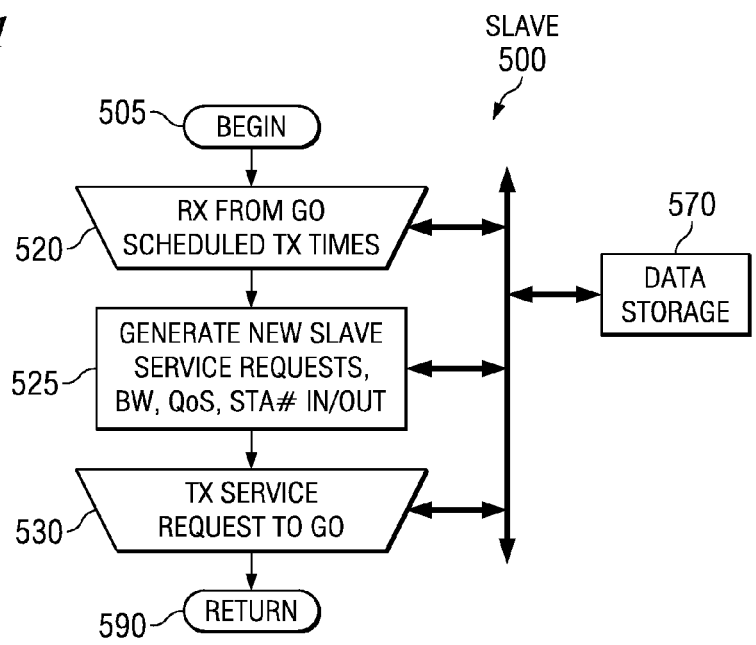
FIG. 12 is a block diagram of a pipe establishment and polling sub-process for slave service requests for inventive WiFi-based USB in the inventive Slave integrated circuit (IC) chip of FIG. 14 or inventive Slave mode in FIG. 16.
Figure 16:
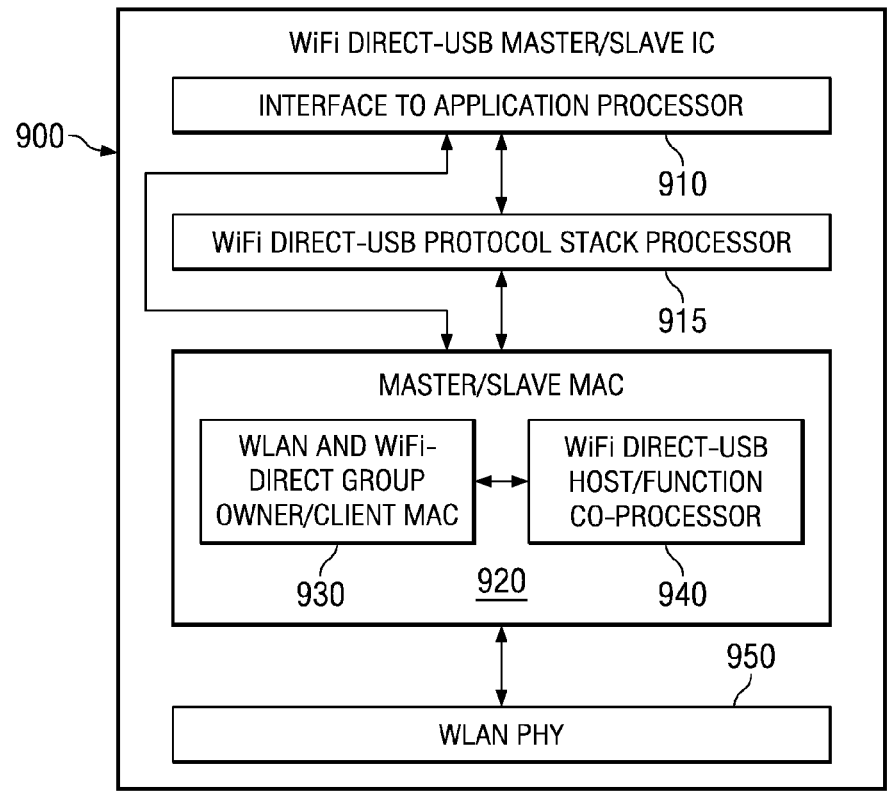
FIG. 16 is a block diagram of an inventive Master/Slave integrated circuit (IC) chip with inventive WiFi-based USB for Master mode or Slave mode operation according to the inventive processes of FIGS. 11-13 and 15.

Turning to FIG. 11, a pipe establishment and polling process supports slave service requests in the Master integrated circuit (IC) chips 200 and 300 with WiFi-based USB in FIGS. 9-10 or Master mode for Master/Slave IC 900 of FIG. 16. The Master as USB host wirelessly gets the service parameters used by the Slave as a USB function by integrating, using, controlling and leveraging a process analogous to wired USB procedure—here the Master accesses a data-structure in a known slave address (end-point 0). This is done when a slave joins the wireless network and becomes established for USB-like operations therein. The master operates in accordance with a combination process embodiment that includes a sub-process 400 in FIG. 11. Operations of sub-process 400 commence with a BEGIN 405. A step 410 proceeds to send MMC_IE 110 in the beacon and subsequently to protect the medium 410. Some of these operations can be suitably embedded or inserted at a point in a process like that of FIG. 13 wherein the beacon with MMC_IE 110 is sent or wherein the medium is subsequently protected. A succeeding step 415 designates a latest STA# for a looping process of communication with each of the stations. A step 420 transmits to the slaves scheduled transmission times for them to send configuration information or other service requests such as IRP's. The scheduled transmission times are suitably inserted as separate rows of FIG. 7 into MMC_IE using a distinctive designator such as Control CTL type in the Type column of MMC_IE. In this way, the designator indicates that a process such as that of FIG. 12 is to use this scheduled information. When the slave stations send their configuration information or other service requests such as IRP's, the master in a succeeding step 430 receives the configuration information or receives IRP's, or the master times out. A decision step 440 determines whether all the stations have been polled and if not loops back to step 415. When all the stations have been polled (Yes), operations proceed to a step 450 that acquires new application requests from applications originating at the group owner unit, and accesses storage 470 for any requests that are still in process of fulfillment. Notice that data storage 470 supports several of the steps 420, 430, 450 and 460. With all the appropriate information thus obtained, the master executes the enhanced USB scheduler at a step 460 whence a RETURN 490 is reached.

USB service requests for FIG. 11 suitably include each of A) USB pipe descriptors and B) USB I/O Request Packets (IRPs).

Regarding USB pipe descriptors, some of the WiFi-based embodiments herein operate in a manner employing or transparent with USB 2.0 spec sections 5.3.1 and 5.3.1.1. In USB, an endpoint descriptor has a bus access frequency/latency, bandwidth, endpoint number, error handling, maximum packet size, transfer type of section, and a data transfer direction between endpoint and host. Using an endpoint 0 (zero), the USB System Software applies default controls to establish a Default Control Pipe that gives access to configuration data, supports control transfers, and responds to USB requests called set_address, get_configuration, and get_descriptor.

Regarding USB IRPs, an IRP requests a data transfer to a pipe in a requested direction. The USB Host software is notified that an IRP has completed, and the USB scheduler may terminate or change the allocation for the given USB pipe. Such changes are reflected in the resulting schedule output from the USB scheduler and the schedule is inserted into MMC_IE for a WiFi-based USB-like embodiment herein and used to determine the PDs thereof as well. This WiFi-based USB-like activity herein occurs for a pipe when IRPs are pending for that pipe, analogous to USB 2.0 spec section 5.3.2.

The pipe-establishment phase and IRPs thus involve initial and subsequent control communications between host/master and functions/slaves to make new service requests. For example, if no service requests were made by any slaves at a given time and/or any data transfers were completed, the USB scheduler still schedules some time for such control communications to keep itself current with network needs for USB-like support subsequently. The host/master wireless networking module concurrently responds to the scheduler to 1) introduce the scheduled times into the MMC_IE and 2) establish one or more short protected medium durations (PDs) in the wireless network for such communications. A WiFi station may have a USB-like hub in an embodiment.

In FIG. 11, pipe establishment for USB-like purposes in a type of WiFi-based-USB embodiment is performed inside the protected medium duration PD(s) established for USB-like operations inside of the beacon-to-beacon interval. Such pipe establishment for USB-like purposes is accomplished by activating and executing the part of the USB stack by which the host (Master) receives service requests from the functions/slaves. In a further part of the process, the scheduler process provided herein establishes the parameters for, and couples them into, the MMC_IE 110 that is then sent in the next WiFi Direct beacon frame outside any PD(s). That MMC_IE notifies the slaves of the schedule while the host/GO concurrently effectively configures the positions and durations of the PD(s) to encompass, or piecewise encompass the schedule (see two PDs in FIG. 4), in the next beacon-to-beacon interval. Note that MMC_IE parameters can be changed or updated in value by the USB scheduler, even without any additional service requests from an application in the master or from a slave, such as when some data transfers are completed and other data transfers are continuing, or because a wireless networking module detects a change in the available bandwidth of the wireless medium.

The process of scheduling PDs for WiFi-based USB is based off the same scheduler as the USB process that does scheduling whereby the USB scheduling basically controls the PDs for reserving USB-like ops as seen by WiFi Direct. The USB scheduler is augmented to take into account the data-rate and any other relevant characteristics of the underlying wireless medium. Everything is run according to the WiFi clock as a shared timebase so that the USB control and data transfer processes and the WiFi wireless networking processes are appropriately coordinated.

Notice that the very different WUSB (UWB) spec section 4.3.7, p. 38, uses a reservation approach with completely different packets called MMCs in a beacon-to-beacon interval. By contrast, the WiFi Direct-USB embodiment sends an IE designated MMC_IE only in the beacon frame and nowhere in a beacon-to-beacon interval (unlike WUSB spec p. 33). Moreover, the WiFi Direct-USB embodiment uses any of CTS2Self, NoA, or HCCA to protect the medium while the conventional WUSB (UWB) lacks any such elements.

Figure 21:
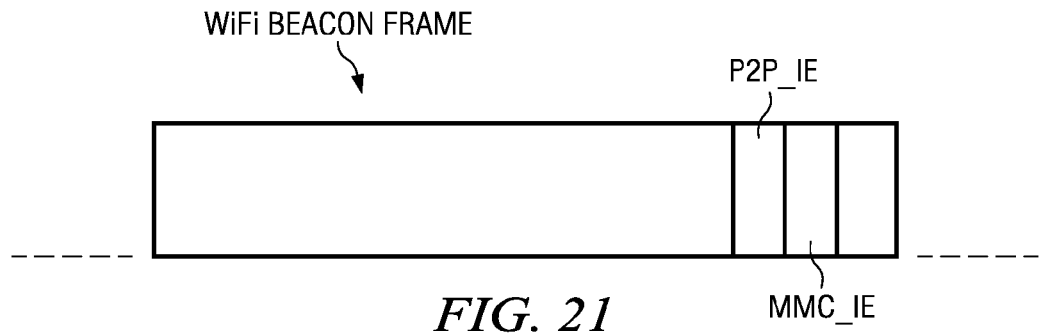
FIG. 21 is a stream diagram versus time of an inventive WiFi beacon frame having information elements (IEs) including both a P2P_IE and an MMC_IE in an inventive WiFi-Direct-USB system and process.

An example of WiFi Direct-USB embodiment in FIG. 21 constructs a Vendor Specific IE and includes the USB-like schedule to constitute MMC_IE in the beacon frame body. MMC_IE is additional to the so-called P2P IE that enables WiFi Direct in the WiFi P2P spec. MMC_IE includes a Vendor Specific IE code for transmission of MMC_IE in the beacon frame body. That Vendor Specific IE code for MMC_IE is distinct from another Vendor Specific IE code that is assigned to P2P_IE.

Further background on WiFi (IEEE 802.11), USB 2.0 and WiFi Direct, is found in:

1) IEEE Standard for Information technology—Telecommunications and information exchange between systems—Local and metropolitan area networks—Specific requirements, Part 11: Wireless LAN Medium Access Control (MAC) and Physical Layer (PHY) Specifications. IEEE Std 802.11™-2007. http://standards.ieee.org/getieee802/download/802.11-2007.pdf 2) Universal Serial Bus Specification (Revision 2.0), Apr. 27, 2000. http://www.usb.org/home 3) Wi-Fi Peer-to-Peer (P2P) Technical Specification: Version 1.1. Wi-Fi Alliance Technical Committee, P2P Task Group. Wi-Fi Alliance, 2010. http://www.wi-fi.org/Wi-Fi_Direct.php The reader can also compare and contrast the embodiments herein with the above-noted Ultra Wide Band (UWB) kind of wireless USB, see *Distributed Medium Access Control (MAC) for Wireless Networks* (MAC Specification: Release 1.5). Dec. 1, 2009. WiMedia Alliance, http://www.wimedia.org/en/ecosystem/specifications.asp.

In FIG. 12, a pipe establishment and polling process supports slave service requests in the inventive Slave integrated circuit (IC) chip with WiFi-based USB in FIG. 14 or Slave mode for Master/Slave IC 900 of FIG. 16. In FIG. 12, a complementary process embodiment 500 is executed in the wireless slave stations to support the operations according to sub-process 400 of FIG. 11 in the master station. These slave operations of process 500 may be formed upon slave device connection to the wireless network, and/or inserted or embedded among the steps of FIG. 15 for subsequent execution and updating as well. Slave operations commence with a BEGIN 505 and proceed to a step 520 that receives scheduled slave transmit times from the AP/GO/Host and stores the times pertinent to the particular slave station in its data storage 570. The scheduled transmission times are suitably extracted as separate rows of FIG. 7 from MMC_IE that have a distinctive designator such as Control CTL type in the Type column of MMC_IE. In this way, the designator indicates that the process 500 of FIG. 12 is to use and respond to this control schedule information from MMC_IE. Then a step 525 generates or accesses slave configuration data that represents USB pipes to be established and transmit such information to group owner in a step 530. Subsequently, slave operations may generate I/O request packets (IRP) at step 525 that operate as updated or supplemental service requests. Some service requests at step 525 may provide information such as currently requested bandwidth, latency and other quality of service (QoS) requirements, and currently requested direction of data transfer. Data storage 570 supports steps 520, 525 and 530. The slave transmits any updated service requests to the AP/Group Owner/Host at step 530 at the scheduled times of step 520. After step 530, a RETURN 590 is reached.

In FIG. 13, WiFi Direct-USB Master Pseudocode represents instructions for a master chip 200 or 300 of FIGS. 9-10 or master mode for Master/Slave IC 900 of FIG. 16. The pseudocode represents a process embodiment 600 that commences with a BEGIN 605 and proceeds to step 610. Step 610 operates the enhanced USB scheduler 335 of FIG. 10 to generate, determine or program TX (transmit) time values of Time T1, etc, and RX (receive) time values of Time T1, etc, for USB-like data. Step 620 forms the MMC_IE of FIG. 7 using those TX and RX values of Time T1 and other values for MMC_IE from step 610. Transmit Beacon step 620 also transmits a beacon frame 334 of FIG. 10 with the MMC_IE (Information Element) thus formed as in FIGS. 4, 5, 7 or FIG. 21. Step 620 thus notifies the Slave stations of the now-scheduled USB-like operations. A next step 630 electronically computes and determines the PDs in start time and duration appropriate for Group Owner to encompass, or piecewise encompass the schedule, and thereby protect the medium for USB transmission under WiFi or WiFi Direct. Step 630 uses the PD information thus determined to actualize protection of the medium for USB transmission under WiFi or WiFi Direct using any one or more of the CTS2Self, NoA, or HCCA processes as discussed elsewhere herein. To effectuate actual execution of the scheduled USB-like operations in the Group Owner according to the schedule and during the PDs, and using the example MMC_IE of FIG. 7, a step 640 in Group Owner/Host Master performs the actual transmissions and receptions scheduled by the MMC_IE according to specified first-through-fourth USB-like transmit times 2100 uS, 3200 uS, 55 mS, 100 mS from the Group Owner; and first and second specified USB-like receive times 3900 uS and 56 mS. A data storage 650 supports these transmissions as a data source and these receptions as a data destination circuit. Thus, step 640 operates at first transmit time 2100 uS to transmit USB-like Data to Slave STA #1. A further step 660 receives its acknowledgement ACK (or timeout). If a destination Slave STA sends no ACK and Master's wait counter times out, then Master re-sends the same data to that Slave after the next beacon.

Further in FIG. 13 after step 660, a step 665 determines whether a USB frame end has been reached in the sense that a PD has timed out. If not, operations loop by an inner-loop back from step 665 to step 640, and WiFi-based USB-like wireless operations during the PD proceed as scheduled for and during that PD. Step 640 operates at second transmit time 3200 uS in the example to transmit Data to Slave #2 of FIG. 2 and at step 660 receive its acknowledgement ACK (or timeout). Another instance of step 640 operates at first receive time 3900 uS for Group Owner as USB-like Host to receive burst Data from Slave #3 and send ACK optionally.

Then operations go via step 665 to a step 670 that de-protects the medium, such as by counter timing out, and WiFi CSMA/CA non-USB operations resume. Step 670 also sets a time counter that counts down a spacing interval SI between the end of one PD and the start of another PD, if any. For instance, if one PD in FIG. 4 ends at 5400 uS (=3900+1500 from FIG. 7) and the next PD starts at 55K uS, then the spacing interval SI is 49,600 uS (=55,000−5400). A further decision step 672 determines if any more USB frames remain to be sent or received according to the schedule developed by step 610. If not, operations reach a RETURN 680, but if so (Yes), operations go to a decision step 675. Decision step 675 determines whether the spacing interval SI counter has timed out. If not, operations branch to a step 678 that performs non-USB-like CSMA/CA WiFi or other processes.

Subsequently in FIG. 13 when SI counter times out, operations proceed from step 675 to a decision step 677 to determine whether the beacon-to-beacon interval BB has ended. If BB ended, operations go back to step 610 and start over. If BB has not ended, operations complete a middle loop back to step 630 and protect the medium and then step 640 operates, e.g. at third transmit time 55 mS to transmit Data to Slave #1 and receive its acknowledgement ACK (or timeout) at step 660. The inner loop from step 665 proceeds in this example to step 640, which operates at second receive time 56 mS to receive Data from Slave #2 and step 660 may send ACK. Operations proceed via step 665 to de-protect the medium 670. No more USB frames are scheduled at step 670 and operations pass through RETURN step 680 back to BEGIN 605. Operations between RETURN 680 and BEGIN 605 do non-USB-like CSMA/CA and other processes. After BEGIN 605, step 610 newly schedules or updates the schedule for more USB-like operations and forms an updated MMC_IE, and step 620 once again operates at time 100 mS to transmit Beacon of FIG. 5 or FIG. 21 with an updated MMC_IE.

FIG. 14 shows a hardware diagram of a Slave IC chip embodiment. In FIG. 14, at a high-level, a Slave integrated circuit (IC) 700 includes an interface 710 for coupling a system microprocessor MPU of a printer, display, or other particular consumer device of FIGS. 1-2 to a WiFi Direct-USB Protocol Stack Processor 715, which in turn is coupled to a Slave Media Access Controller MAC 720. Slave MAC 720 includes a wireless networking WLAN MAC circuit (or processor core) 730 for operation as an 802.11 WLAN and WiFi Direct "device" (one that is not a Group Owner). Further, a coprocessor circuit or core 740 is operative as an enhanced USB "function" circuit that is not a USB Host. Coprocessor 740 provides USB operations of FIG. 3 on the slave side and operates as in FIG. 15. This operation is interrelated with MAC circuit 730 to receive the GO/Host part of the signal stream of FIG. 4 and construct and wirelessly transmit the part of the signal stream of FIG. 4 that emanates from the slave. A WLAN PHY 750 provides a physical layer circuit coupled with Master MAC 720 that actually generates the RF wireless signals including the slave parts of signal stream of FIG. 4 as modulation and feeds them to its WLAN antenna(s). PHY 750 includes a WLAN receiver to receive RF wireless signals from the AP/GO/Host and feed them to the Slave MAC 720 and other circuits of FIG. 14 to respond appropriately.

Figure 15:
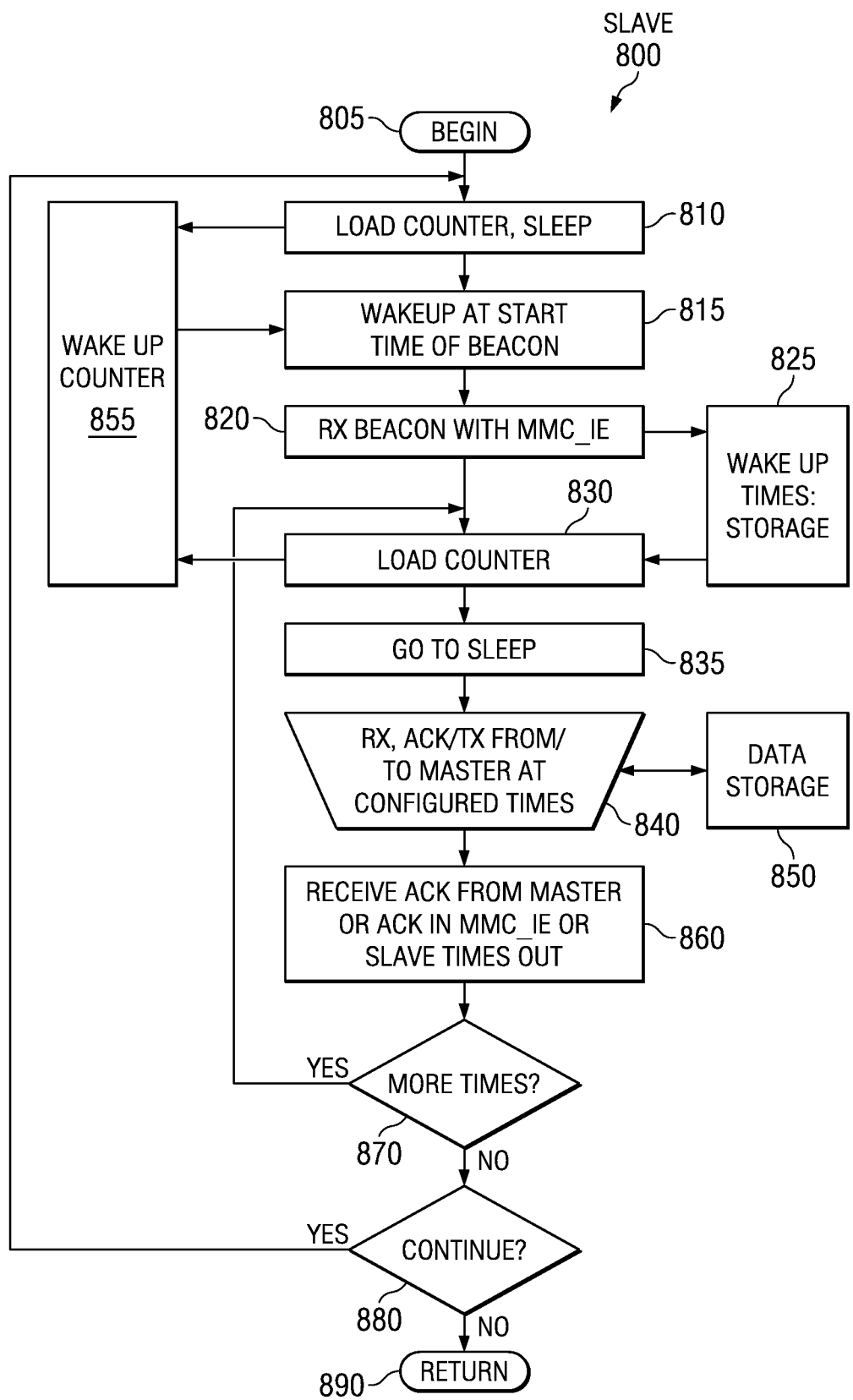
FIG. 15 is a flow diagram of an inventive Slave process for WiFi-based USB in the Slave integrated circuit (IC) chip in each of FIG. 14 and inventive Slave mode in FIG. 16.

In FIG. 15, a process embodiment flow also represents software directing further remarkable operations in FIG. 14 slave chip 700 responsive to MMC_IE from AP/GO/Host chip 200 of FIG. 9.

In FIG. 15, WiFi Direct-USB Slave instructions for a process embodiment 800 direct the FIG. 14 slave chip 700 or a slave mode of a FIG. 16 Master/Slave chip 900. Process 800 commences with a BEGIN 805 and loads a counter 855 with a sleep interval in a step 810. In due course, the slave process 800 becomes awake in a step 815 at start of Beacon frame. Then a step 820 receives the remarkable improved beacon frames including MMC_IE Information Element of FIGS. 5 and 7 (and FIG. 21 that combines MMC_IE and P2P IE in the same beacon frame). Step 820 provides the FIG. 7 information in MMC_IE as wake up times to a storage circuit 825. Next a step 830 loads or sets a wake-up timer in circuit 855 for wake-up by, e.g., 3200 uS (per FIG. 7) and moves to low-power sleep mode in a step 835. Notice that non-USB WiFi or WiFi Direct operations may occur and proceed outside the PDs of FIG. 4 in the STA# that has this Slave process for supporting USB PDs. Upon time-out of USB wake-up timer in circuit 855, the slave process wakes up timely before and in time for executing step 840 operations by Time T1=3200 uS and receives Data packet(s) from the AP/Group Owner/Host (or transmits thereto if MMC_IE directs). A data storage 850 provides a place for storing the received data or a source for data to send and transfer over the network. Slave sends a WLAN acknowledge ACK upon a reception of data according to step 840. A step 860 handles optional ACK from Master within a USB PD if Slave is the transmitting STA, or times out. Alternatively, for step 860, the MMC_IE format used by the Master in some embodiments includes an ACK in the Type column, or uses an additional field or column to indicate an ACK, either way responsive to a slave transmission during the just-completed BB; and a Slave in step 860 appropriately parses MMC_IE to detect an ACK directed to that Slave from the Master. If as determined by a decision step 870, the FIG. 8 schedule indicates more instances of Time T1 for operations, then operations loop to step 830, which sets the USB wake-up timer to, e.g., 56 mS and step 835 moves to low-power mode. Upon time-out of wake-up timer, slave wakes up timely at step 840 before and in time for operations by time T1=56 mS and sends USB Data packet(s) based on data from storage 850 to the AP/Group Owner/Host. Slave at a step 860 sets a wait timer and waits for optional ACK from Group Owner acting as USB-like Host, or until timeout of the wait timer in circuit 855 of the slave. At this point step 870 determines no additional instance of Time T1 exist for this Slave in FIG. 8. Operations branch from step 870 to step 880. Slave at step 880 loops back to step 810, unless the device is being turned off or reset or other reason not to continue. Step 810 now sets the slave wake-up timer to a time near the beginning of the next beacon (e.g., 98 mS) and moves to low-power mode as to USB at step 810. Notice that WiFi or WiFi Direct operations may continue in the STA# that has this Slave process. Upon time-out of wake-up timer, slave wakes up timely at step 815, whereupon the process at step 820 receives a new Beacon and MMC_IE from the WiFi Direct-USB master, at approximately 100 mS at the right side of FIG. 4.

FIG. 16 shows a hardware diagram of still another IC chip embodiment. In FIG. 16, at a high-level, a Master/Slave integrated circuit (IC) 900 includes an interface 910 for coupling an application processor MPU of a mobile handset device or any other particular consumer device of FIGS. 1-2 to a WiFi Direct-USB Protocol Stack Processor 915. Processor 915 in turn is coupled to a Master/Slave Media Access Controller MAC 920. The Master/Slave integrated circuit (IC) 900, when provided in an electronic device, such as any device of FIG. 1 or 20, operates according to a master mode or a slave mode, depending on the outcome of a WiFi negotiation process that determines which station is the AP/Group Owner. Whichever station is made AP/Group Owner is also herein made the USB Host for USB-like wireless operations. If that station has a Master/Slave integrated circuit (IC) 900, it is a Master due to the negotiation outcome and is set up in Master mode. All other stations that have a Master/Slave integrated circuit (IC) 900 are Slaves due to the negotiation outcome and are set up in Slave mode. If a station uses a Slave integrated circuit (IC) 700, that station operates as a Slave because that is the functionality it offers. Notice that the couplings and operations in FIG. 16 depend on whether the Master/Slave integrated circuit (IC) 900 is in its master mode or slave mode. If master mode, then MAC 930 acts as a Group Owner GO, and if in slave mode it acts as a device (one that is not a GO). Further, a coprocessor circuit or core 940 is operative as an enhanced USB "function" circuit or as an enhanced USB Host depending on the slave mode or master mode respectively. Coprocessor 940 provides mode-driven USB operations for FIG. 3 in FIG. 4 and operates as in FIGS. 11 and 13 in master mode and as in FIGS. 12 and 15 in slave mode. In Slave mode, this operation of coprocessor 940 is interrelated with MAC circuit 930 to receive and use the AP/GO/Host part of the signal stream of FIG. 4 and process it and construct and send the part of the signal stream of FIG. 4 that emanates from the Slave. In Master mode, this operation of coprocessor 940 is interrelated with MAC circuit 930 to receive the Slave part of the signal stream of FIG. 4 and process it and construct the part of the signal stream of FIG. 4 that emanates from the AP/GO/Host. A WLAN PHY 950 provides a physical layer circuit coupled with MAC 920. PHY 950 actually generates the RF wireless signals including as modulation the master parts or slave parts of signal stream of FIG. 4, depending on the master or slave mode being used, and feeds them to its WLAN antenna(s). PHY 950 also includes a WLAN receiver to receive RF wireless signals from the AP/GO/Host and feed them to the Master/Slave MAC 920 and other circuits of FIG. 16 to respond appropriately.

In FIG. 17A, the P2P stack depicts a software stack for a WiFi Direct-USB embodiment, such as for storage in a flash memory of the station. Client software is situated atop the USB stack that provides USB device class functionality. The wireless part of the stack has a WLAN PHY, a WLAN MAC next above, and then WiFi Direct P2P software enhanced for MMC_IE and medium protection PD formation. The USB stack is provided with a driver module that couples the USB stack with the WiFi Direct P2P software so that WiFi and USB are interactively coupled and scheduled such as in FIGS. 10 and 11 and as described further elsewhere herein.

In FIG. 17B, three other P2P stacks are illustrated for comparison with FIG. 17A in TABLE 4. TABLE 4 shows solution tradeoffs and comparison of WiFi Direct-USB to alternative technologies in FIG. 10. Good=at least ~10% better, OK=normative, Low=at least ~10% below normative.

ment is or can be optimized and can enable higher throughput since the system is not throttled or limited by TCP/IP and browser CPU utilization. Even with a faster processor at 80 Mbps, throughput might be limited in case of TCP/IP and browser CPU utilization, while WiFi Direct-USB stack and the same processor desirably use less memory and desirably involve less processing.

Figure 20:
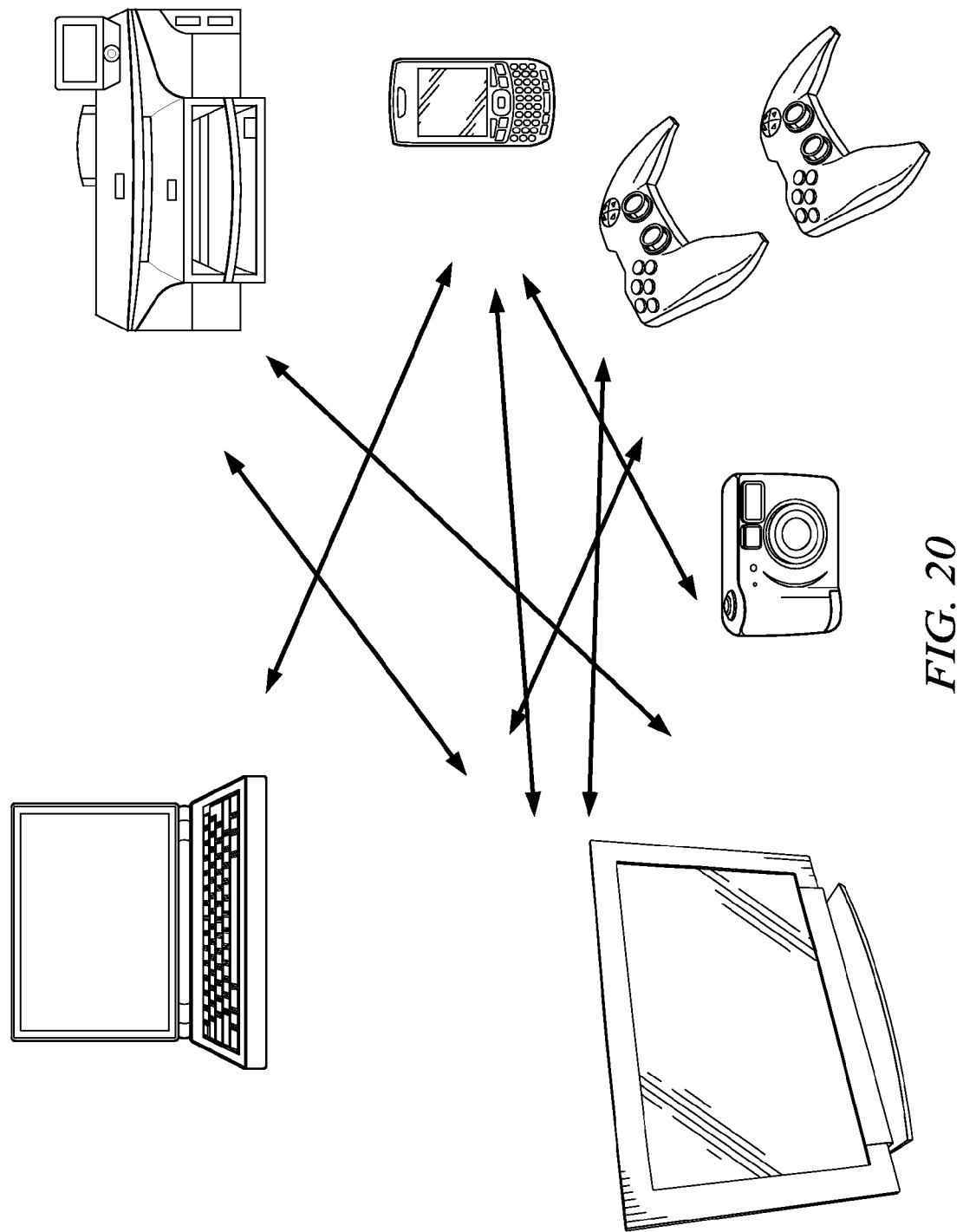
FIG. 20 is a pictorial network diagram of a WiFi Direct network with a Group Owner and peer-to-peer (P2P) clients, improved as shown in the other Figures.
Figure 22:
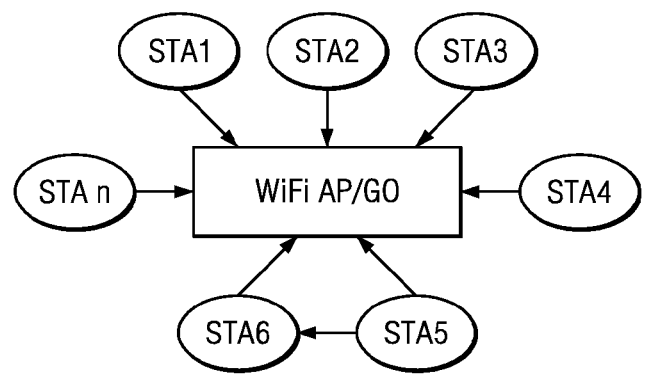
FIG. 22 is a network topology diagram of a concurrent WiFi Direct Group Owner and peer-to-peer (P2P) clients, the WiFi Direct Group Owner sending the inventive WiFi beacon frame of FIG. 21.

FIGS. 20 and 22 show a variety of wirelessly connected set of CE devices virtually attached by WiFi-Direct-USB herein. A negotiation process under WiFi Direct establishes one of the stations as AP/Group Owner. P2P operations, such as illustrated between STA 5 and STA 6, are supported under WiFi Direct.

FIG. 21 shows a WiFi beacon frame with both a P2P_IE and MMC_IE for a WiFi Direct-USB embodiment as discussed elsewhere herein.

Regarding WiFi Direct itself, peer to peer wireless networking has been introduced in WiFi (802.11), see for some background, U.S. Published Patent Application 20100278065 "Traffic Load Estimation for Access Point Functionality Enabled Mobile Devices" dated Nov. 4, 2010, which is incorporated herein by reference in its entirety.

Power consumption reduction is an important consideration in such systems. See for some background, U.S. Published Patent Application 20080170552 "Idle Connection State Power Consumption Reduction in a Wireless Local Area Network Using Variable Beacon Data Advertisement" dated Jul. 17, 2008, which is incorporated herein by reference in its entirety.

TABLE 4

SOLUTION TRADEOFFS

| Hybrid | Proliferation | Host CPU Loading | User Experience | Performance | Local/Remote Use |
|---|---|---|---|---|---|
| Wireless USB/P2P | N/A | Good | OK | Good | (no remote) |
| USB/P2P | Good | Good | OK (Could require Driver download) | OK (protocol Overhead) | (no remote) |
| DLNA/P2P | Good | IP Stack Overhead | Good (browser based) | (protocol + stack overhead) | Good (same for local/remote) |
| Proprietary/P2P | Low | Stack Dependent | Good (proprietary) | OK | Low |

In FIG. 18, the P2P stack depicts a software stack of FIG. 17A for a WiFi Direct-USB embodiment in another way. Note the additional Adaptation Layer 358 and compare enumerated modules with FIG. 10.

In FIG. 19, a WiFi Direct-USB protocol stack on left is compared with an example of a WiFi conventional protocol stack on right. The WiFi-based-USB protocol stack uses less memory and involves less processor burden. It appears that conventional TCP/IP processing generally uses more context switching and memory copying because it is an asynchronous protocol. By contrast, the USB processing is a synchronous protocol that uses far less context switching and memory copying.

The FIG. 19 comparison in a testing process embodiment can be performed with different system parameters such as file download rates and processor speeds. For one testing process embodiment, an application processor runs each stack—performing WiFi IP (Internet Protocol) download of a file at 20 Mbps and then performing WiFi Direct-USB download of the same file. The WiFi Direct-USB Stack embodi- Some embodiments use WiFi Direct as underlying P2P protocol for 1) Device discovery, 2) Link establishment, 3) Link management, 4) Power management. A WiFi Direct-USB entity embodiment acts compatibly in its role also as a WiFi Direct device. A WiFi Direct-USB Host is a WiFi Direct Group Owner (GO), and a WiFi Direct-USB Device is a WiFi Direct Client.

Some background on WiFi Direct operations is provided next. A device becomes a Group Owner or a Client in the following manner. Each device discovers other P2P Devices in its transmit/receive range by probe request/response signals to discover device type, ID information, and services supported. The probes may be set up to target particular types, IDs or compatibilities of devices. If a Group already exists and a newly-arrived device is probing, only the existing Group Owner responds. A P2P device has a globally unique MAC address and has a unique P2P Device Address derived from that MAC address. The user selects via the GUI of the device, or automatic software selects, which of the discovered P2P devices to connect to and enters a PIN (also called Provisioning Information). Authentication in WiFi Protected Setup (WPS) detects whether subsequently-connected devices have same WPS PIN, for instance. Each WiFi Direct device has software for both Group Owner and Client operation, depending on the outcome of a negotiation procedure. The devices negotiate which device is to become a Group Owner, such as a device with more processing power and functions to be employed. For instance, a device that has hardware and software to perform substantial processing, service and/or user-interaction functions likely becomes a Group Owner as a result of the negotiation process of WiFi Direct. A P2P Device may become Group Owner if it can connect to a WLAN or has more application functionality or upper layers for service. The newly-established Group Owner then uses WPS to supply a security pass code (WPA2 PSK) and a WiFi SSID for the P2P ad hoc network, or Group. The Group Owner starts a P2P Group session, whereupon the Client joins the Group. The Group has a unique Group ID formed by combining the P2P Device Address of the Group Owner and the SSID. The SSID has a fixed prefix to enable Legacy Clients (non-Wifi-Direct WiFi operable units) to distinguish the P2P Group from a non-WiFi-Direct WiFi WLAN. The SSID includes a dynamically-created prefix to prevent roaming by WiFi devices between P2P Groups. The Group Owner also selects a channel for operation as a result of an alternating process in each device of a Search mode that advertises for a P2P device to communicate with, and a Listen mode that advertises presence on a channel. A subset of all WiFi channels may be used to lower convergence time. When Group Owner has determined the converged channel, Group Owner starts sending beacons that include the TSF, operational parameters, supported capabilities, WPS IE, and P2P IE. A Group Owner can gracefully end a P2P Group session by deauthenticating all its Clients, but otherwise the P2P Group session is ended when the Group Owner goes out of range or becomes unresponsively inactive such as by power-down. Analogously, a Client can gracefully leave the Group by disassociating or deauthenticating itself, and otherwise the Group Owner determines the current Client status and disconnects it from the Group by rejecting the Client authentication or denying its association with the Group.

In a WiFi Direct-USB embodiment, attachment of a device for USB-like operations uses P2P Device Discovery, and uses P2P's Probe-Request and Probe-Response frames. The P2P Client's Interface Address can serve as the Slave STA unique USB-like address. The device also uses P2P Group Formation and uses P2P Group Owner (GO) Negotiation for Master/Slave negotiation. A Master is assigned or has Group Owner Intent Value=15. The process embodiment also supports an WiFi Direct-USB "on-the-go" scheme. P2P Service Discovery is used to identify a P2P device as a WiFi Direct-USB embodiment device. A WiFi Direct-USB embodiment of a slave can join an existing WiFi Direct-USB group based on P2P Invitation Procedure. Invitation in WiFi Direct can work as follows. Suppose a laptop and a projector are in a so-called Persistent P2P Group in which laptop is Group Owner. A third device PDA probes the laptop. Projector responds to the PDA probe and provides information on the devices in the Group. PDA sends Invitation to re-invoke the Persistent P2P Group, laptop accepts and starts a session for PDA to join.

Interoperability of embodiment with WLAN Infrastructure networks leverages on P2P Managed Devices and allows the infrastructure AP (WLAN access point) to control the operational parameters of the P2P network. Such control process is suitably used by the skilled worker (say, in an IT information technology department of an organization) to optimize P2P Devices within the IT defined channel mappings assigned to IT controlled APs. The process controls the operating channel of the P2P network (including channel switch) and controls maximum transmit power. In this way, enterprise IT can optimize operation of WiFi-Direct and ensure interoperability with infrastructure AP.

Some attributes of the physical layer PHY are: 2.4 GHz (3 channels) & 5 GHz (10+ channels), under the IEEE 802.11n standard for instance. 40 MHz SISO (single-input, single-output) and 2×2 20 MHz MIMO (multiple-input, multiple-output) (~150 Mbps) is a baseline for the PHY, and 2×2 40 MHz MIMO (300 Mbps), and higher MIMO are optional for higher rates.

The data rate capacity of the wireless medium such as in 802.11(n) is discussed next. For a single antenna, the data rate R for MAC and PHY together may be as high as 50 Mbps or more. The analogous data rate R for MIMO scales approximately linearly. For instance, 2×2 MIMO may support up to 150 Mbps or more, and 4×4 MIMO as much as 600 Mbps or more. Also, multiple wireless links can be employed to transfer data so that the effective data rate capacity is even higher. Accordingly, wireless systems based on WiFi 802.11 provide a suitable environment that can support, e.g. 480 Mbps USB 2.0 data transfers wirelessly and still leave spacing intervals SI of practical duration for CSMA/CA WiFi or WiFi Direct networking operations between PD's used for the USB-like operations combined with those networking operations as taught herein.

Among advantages and benefits of such WiFi Direct-USB embodiments are that it extends the reach of WiFi-Direct, and provides a stepping stone on a roadmap for an even more advanced generation of embodiments based on WLAN-family technologies based on IEEE 802.11ac and/or 802.11ad standards.

Figure 24:
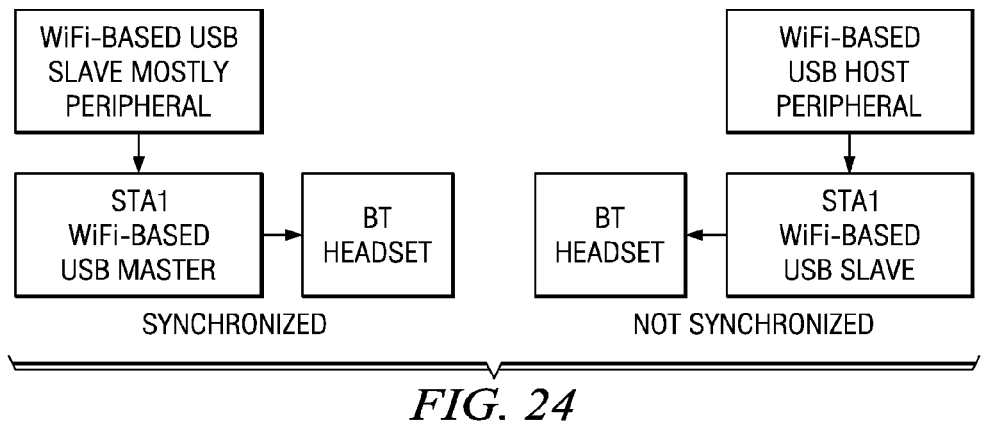
FIG. 24 is a comparative network diagram of stations with a Bluetooth short range wireless connection co-existing with a WiFi-based USB process, showing opposite USB host/slave assignments.

WiFi Direct operations include intelligent power savings and P2P link management, unlike WiFi that appears to route all WLAN through AP. WiFi Direct supports peer applications well, like gaming and fast synch info between handsets. But MAC Layer 2 is not believed defined by WiFi Direct. Various WiFi Direct-USB embodiments also include enhanced power management because explicit host transaction scheduling provides opportunities for power management. Host and Slave have explicit times when they can transmit and receive. At all other times, radios can be power managed using P2P Power Management. One power management process embodiment is a P2P Group Owner Opportunistic Power Save Procedure. Another power management process embodiment is a P2P Group Owner Notice of Absence Procedure. WiFi Direct power saving procedures for P2P devices of all kinds include 1) constraints on address of target use-cases, 2) burst transfers, 3) WiFi Multimedia WMM® traffic specifying latency sensitivity, 4) absence signaling. In FIG. 24, Group Owner can absent itself for specified periods under an opportunistic power save procedure (e.g., during burst transfers by other devices. This way, Client has a limited CTWindow period starting at each TBTT to go from Power Save to Active Mode. Group Owner signals the CTWindow size and use of Opportunistic Power Save in Beacon frames.

Another power-saving procedure, called Notice of Absence (NoA), is used by Group Owner in the beacon to signal the P2P network devices that Group Owner is scanning other channels of another network, for instance. Clients that have latency-sensitive traffic can send a Presence Request to Group Owner to reduce such absence. To maintain discoverability, if a P2P Client is asleep and a newly-arriving device is probing to discover that type of Client, then Group Owner responds to the probe.

WiFi Direct-USB embodiments can provide for removal of a Device STA and Bus Enumeration. Removal of the WiFi Direct-USB Device embodiment is based on a Disconnecting P2P Device section in the WiFi Direct spec. Bus Enumeration in wired-USB identifies and assigns a unique address to devices attached to the logical bus. In a WiFi Direct—USB example, devices attach or detach from the logical bus at any time, so bus enumeration is operative in an on-going manner. Here, for example, the bus enumeration uses the P2P Interface address. As to data types, WiFi Direct-USB supports the same data transfer and pipe types as wired USB: Isochronous, Bulk, Interrupt, Control. Bus Protocol Security is based on P2P security, so that communication within a P2P Group employs advanced WPA2-Personal security.

Figure 23:
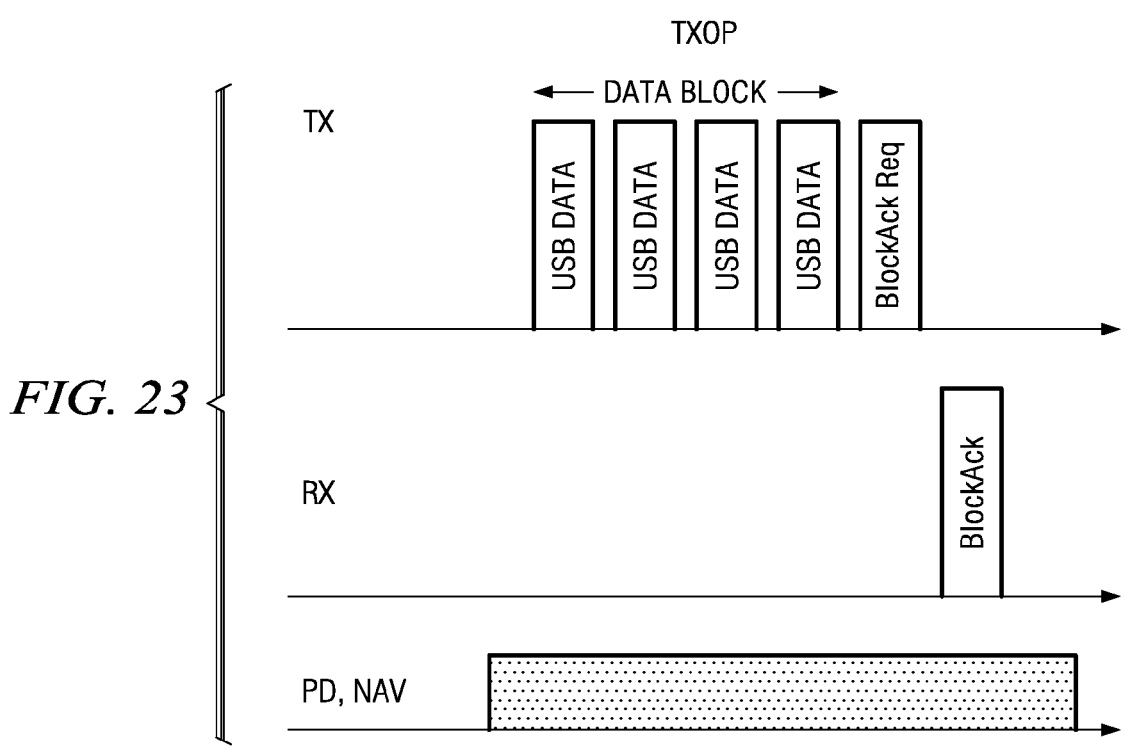
FIG. 23 is a stream timing diagram of bursting activity in an inventive WiFi-based USB process.

FIG. 23 depicts USB-like bursting activity compatible with WiFi and WiFi Direct, either of which is deployed as taught herein for USB-like operation wirelessly in the burst ("In#3, In#3, In#3") of FIG. 4. Burst packets of USB-like data are transmitted by whichever station STA or AP/GO/Host is scheduled for USB-like transmission TX according to the schedule in MMC_IE. The TX burst concludes with a request for acknowledgment, that burst is wirelessly acknowledged ACK by the receiving Slave station or optional ACK if AP/GO/Host is receiving (RX). NAV protection under control of the enhanced USB scheduler of FIG. 10 herein prevents slave stations, ones that are not addressed by MMC_IE for a given USB-like operation at a given time, from using the wireless medium. Timing is based on GO's TSF (Timing Synchronization Function) transmitted in the beacon. TSF resolution is 1 usec (one microsecond). Burst Mode uses WLAN's Block Acknowledge Block ACK (with Immediate policy) in FIG. 4 to allow multiple data packets per data phase, which improves efficiency of transaction.

FIG. 24 shows an embodiment of WiFi-based-USB coexistence with Bluetooth BT coupled to the system. WiFi Direct-USB confers BT coexistence because WiFi-based USB herein is not incompatible with, and does not disturb, Bluetooth. For some background on Bluetooth, see U.S. Published Patent Application 20100329202 "Channel Utilization Improvement in Coexisting Wireless Networks" dated Dec. 30, 2010, which is incorporated herein by reference in its entirety.

Figure 25:
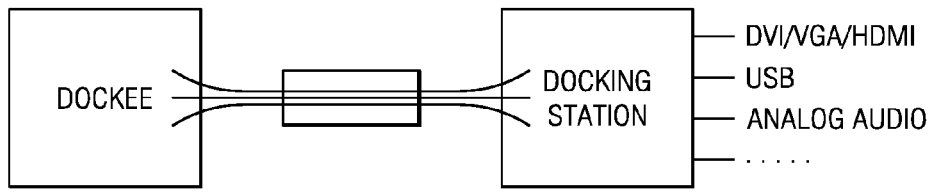
FIG. 25 is a network diagram of a docking station inventively coupled with a Dockee according to a WiFi-based USB process embodiment of the other Figures.
Figure 26:
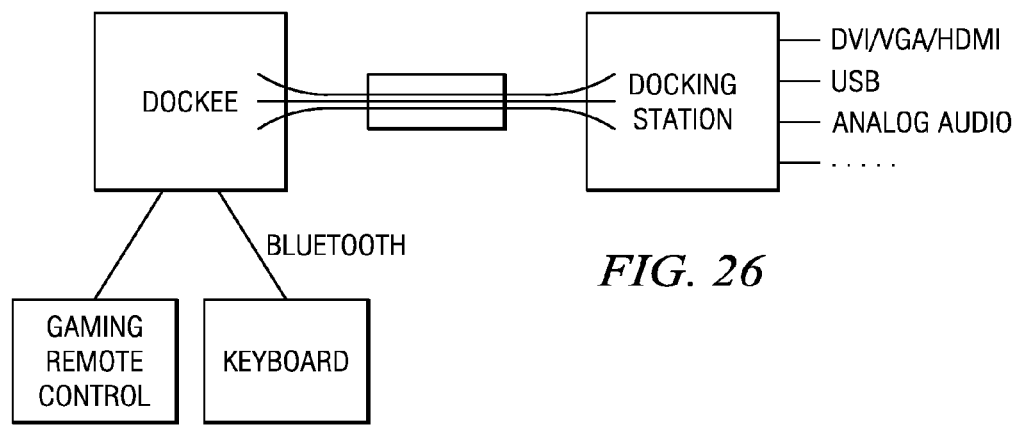
FIG. 26 is a network diagram of a docking station with a Dockee that is wirelessly coupled for data transfers with gaming controls according to a WiFi-based USB process embodiment of the other Figures.
Figure 27:
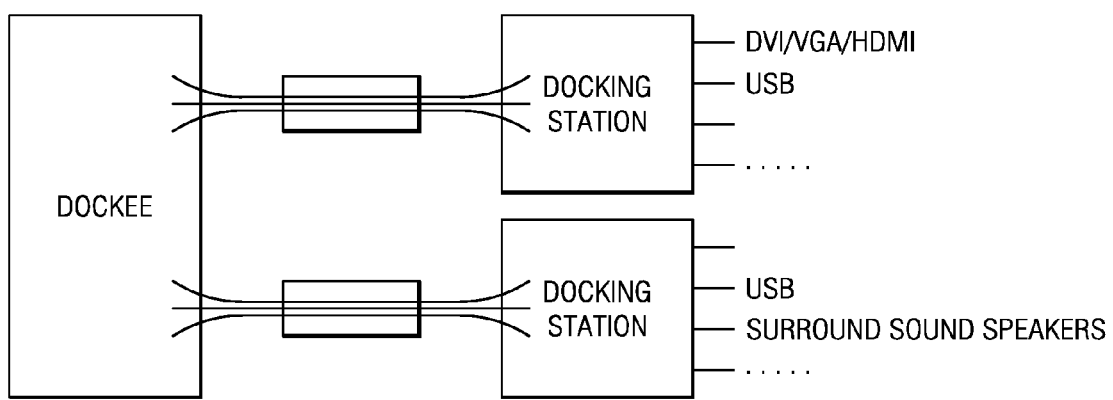
FIG. 27 is a network diagram of a pair of docking stations with a Dockee that is wirelessly coupled for data transfers to the docking stations according to a WiFi-based USB process embodiment of the other Figures.

Turning to FIGS. 25-27, note that as portable products get smaller, portability is enhanced but productivity and user experience may be reduced in some ways due to smaller form factor in proportion to desirable viewing area for human eyes and due to smaller keyboard keys in proportion to human fingers. Screens with 1600×1200 or higher resolution can provide a better user viewing experience than some viewing scenarios with the small display of a portable device. Also, some dedicated peripherals can enhance user experience of typing (keyboarding), drawing, gaming, and listening to music. Some embodiments accordingly wirelessly couple wireless docking and/or high-end peripherals to small portable products. In this way, the smaller display and buttons of the portable device are available and further high-end peripherals can be used as well.

To support such coupling, wireless docking is made convenient, automatic, safe and fast by various WiFi-based USB embodiments herein. This obviates inconvenience of clicking through menus, installing drivers, and entering passwords each time a docking wireless coupling is to be established. To enter a docking environment, the improved phone or netbook beeps, user utters a predetermined word (e.g., Dock), the desktop appears on the screen and the mouse works. This process is safe because the desktop does not appear on a neighboring screen. Wireless transmission of high performance video executes with high-resolution, (e.g., 1600×1200 pixels or more), with fast response times suitable for gaming as well. High speed wireless access is thus provided to peripherals, such as home audio, webcams, microphones, remote controls, etc. Automatic configuration of WiFi Direct, Bluetooth, Zigbee (RF4CE), Wireless Power, and other connections is accomplished in the docking environment.

Interface standardization valuably promotes such embodiments because docking environments can consist of products made by different vendors. Docking environments are more attractive when they work with a large variety of portable products. Accordingly, some embodiments build on connectivity standards such as on top of WiFi Direct (such as using 802.11n security) and Bluetooth. 60 Ghz connectivity is suitably included in some embodiments. Docking embodiments desirably support low-power dockees and peripherals that work with WiFi Direct using 802.11g. Wireless charging is optionally provided in some of the docking embodiments.

In FIG. 25, an uncomplicated docking embodiment has a device (the docking station) that connects the dockee with legacy peripherals via a WiFi-Direct connection. Various streams of content (Video DVI/VGA/HDMI, USB, analog audio, etc. are tunneled through one wireless link that replaces or supplements a notebook docking port, as taught and shown in the various Figures herein. The acronyms refer to Digital Visual Interface (DVI), Video Graphics Array (VGA), and High-Definition Multimedia Interface (HDMI).

In FIG. 26, direct links are added, such as to keyboard and to gaming remote control. Docking Station provides the connection with legacy display and provides the dockee with the information needed to set up direct links with other peripherals in the docking environment.

In FIG. 27, a multi docking station embodiment combines docking stations into a single docking environment. For example, a TV with docking station capability in one form of such embodiment is combined with a high fidelity stereo or other full-sound home audio system with integrated docking station capability.

The docking configuring and other docking experience are made intuitive and effortless to facilitate intuitive user-interaction with the docking environment. Docking Environment refers to a group of peripherals that belongs together. A docking environment is configured. Adding, or removing, peripherals from the docking environment involves deliberate action. A dockee would expect to automatically connect with all peripherals that are available in the environment. Dockee refers to a portable product (e.g. smart phone, netbook, laptop, camera) that is brought into the docking environment and uses the peripherals. Docking Station refers to a device that coordinates the setup of connections between Dockee and all peripherals in the environment. In addition it may also provide the connection between Dockee and legacy peripherals. Wireless Docking Peripheral refers to a peripheral in the Docking Environment, such as a mouse, keyboard, USB hard drive, webcam, display, etc.

A wireless video display interface valuably contributes to user experience. Key parameters of the Docking Environment are throughput, delay, QoS, uncompressed vs. compressed, compression method, power consumption, and number of antennas. Support for multiple alternative wireless display interfaces is provided. Uncompressed HD video has 3 Gbps data rate and the HD interface technology is evolving, and compression is desirably provided. Uncompressed HD over wireless is suitably used in some embodiments. Dockees can trade off screen-resolution for latency in a configurable manner to provide different types of operation for still image display and game play and provide satisfactory viewing experiences for each.

Connecting to USB peripherals is an important part of the Docking Environment. USB protocol operates on top of WiFi-Direct in some embodiments. Docking Station can connect with the installed base of wired USB peripherals. Simple USB peripherals (Mouse, Keyboard, Webcam) might, but to save cost do not need to, have a wireless USB connection. Docking Station USB ports suitably behave as if each were a USB port on the Dockee, including plug & play. A Dockee suitably can connect directly (P2P, without needing Docking Station) to any peripheral that includes a WiFi-Direct-USB embodiment.

Wireless Docking herein is independent from DLNA, yet compatible, and solves different problems to constitute yet further combination WiFi-based USB embodiments. DLNA helps discover music, video, and pictures in a home network and stream them to a rendering device. The rendering device decodes the multimedia format (JPEG, MP3, AVI) and renders on an attached peripheral. By contrast, in Wireless Docking here, the Dockee is the rendering device and the Docking Environment allows the rendering device to display the video on a peripheral that is connected wirelessly with the Dockee. Some usage scenarios include Notebook computer in office docking with a non-HD television or instead with an HD TV. Video playback from Dockee phone into a television of either type is supported. Multi-device docking of Dockee laptop and another Dockee phone handset with a PC or TV docking station is provided in office or home. A Dockee phone handset can dock with a particular PC station among many such PC stations in an Internet café for convenient e-mailing and web-browsing. A game console Dockee docks with a television. The game remote(s) are each a Wireless Docking Peripheral to the game console. Camcorder playback scenario involves a camcorder Dockee docking to a television and has one-way or two-way interaction with a TV remote. The camcorder is wirelessly recharged in the room. Camcorder archiving is wirelessly swiftly provided in gigabit volumes by various WiFi-Direct-USB embodiments as described and between the camcorder and a PC with storage.

Returning to FIG. 10, it is contemplated that the skilled worker uses each of the integrated circuit cores shown in FIG. 10, or such selection from the complement of blocks therein provided into appropriate other integrated circuit chips, or provided into one single integrated circuit chip, in a manner optimally combined or partitioned between the chips, to the extent needed by any of the applications supported such as voice WLAN gateway, cellular telephones, televisions, internet audio/video devices, routers, pagers, personal digital assistants (PDA), microcontrollers coupled to controlled mechanisms for fixed, mobile, personal, robotic and/or automotive use, combinations thereof, and other application products now known or hereafter devised for increased, partitioned or selectively determinable advantages.

A separate cell phone modem is suitably interfaced with the applications processor and interface 310. Applications processor, for example, can include a RISC processor (such as MIPS core(s), ARM core(s), or other suitable processor), a digital signal processor (DSP) such as from the TMS320C55x™ DSP generation and/or the TMS320C6x™ DSP generation from Texas Instruments Incorporated or other digital signal processor(s), and a shared memory controller with DMA (direct memory access), and a 2D (two-dimensional display) graphic accelerator. The RISC processor and the DSP suitably have access via an on-chip extended memory interface (EMIF/CF) to off-chip memory resources for memory 328 including as appropriate, mobile DDR (double data rate) DRAM, and flash memory of any of NAND Flash, NOR Flash, and Compact Flash.

Digital circuitry on core 310 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service HSDPA/HSUPA (High Speed Downlink Packet Access, High Speed Uplink Packet Access) (or 1xEV-DV, 1xEV-DO or 3xEV-DV), via an analog baseband chip and GSM/CDMA transmit/receive chip (in cell modem).

An audio/voice block is suitably provided to support audio and voice functions and interfacing. Speech/voice codec(s) and speech recognition are suitably provided in memory space in such audio/voice block for processing. Applications processor 310 in some embodiments is coupled to location-determining circuitry for satellite positioning such as GPS (Global Positioning System) and/or to a network-based positioning (triangulation) system, to an accelerometer, to a tilt sensor, and/or other peripherals to support positioning, position-based applications, user real-time kinematics-based applications, and other such applications.

A power conversion block, power save mode control, and oscillator circuitry for clocking the cores are also provided. A display is provided off-chip. Batteries such as a lithium-ion battery provide power to the system and battery data.

Further in FIG. 10, chip (or core) 310 interfaces to the rest of the blocks of FIG. 10 for high-speed WLAN 802.11a/b/g/n as detailed elsewhere herein. Other data wireless interfaces are suitably provided for co-existing IEEE 802.15 (Bluetooth and low and high rate piconet, Zigbee, and personal network communications) wireless circuit as in FIG. 24. Other interfaces suitably include a MCSI voice interface, a UART interface for controls and data to position unit GPS and otherwise, and a multi-channel buffered serial port (McBSP) for data. Further in peripherals, a MicroWire (u-wire 4 channel serial port) and multi-channel buffered serial port (McBSP) to Audio codec, a touch-screen controller, and audio amplifier to stereo speakers. External audio content and touch screen (in/out) and LCD (liquid crystal display), organic semiconductor display, and DLP™ digital light processor display from Texas Instruments Incorporated, are suitably provided in various embodiments and coupled to interface 310 for fixed, portable, mobile and/or vehicular use. An interface provides EMT9 and Camera interfacing to one or more off-chip still cameras or video cameras, and/or to a CMOS sensor of radiant energy.

In FIG. 10, in some embodiments, GPS operates in close coordination with any one, some, or all of WLAN, WiMax, DVB (digital video broadcasting), or other network, to provide positioning, position-based, and user real-time kinematics applications. Still other additional wireless interfaces such as for wideband wireless such as IEEE 802.16 WiMAX mesh networking and other standards are suitably provided and coupled to the applications processor integrated circuit and other processors in the system.

Various embodiments as described herein are manufactured in a process that prepares a particular design and printed wiring board (PWB) of the system unit and has an applications processor coupled to a modem, together with one or more peripherals coupled to the processor and a user interface coupled to the processor or not, as the case may be. A storage, such as SDRAM and Flash memory is coupled to the system (e.g., FIG. 10) and has tables, configuration and parameters and an operating system OS, protected applications (PPAs and PAs), and other supervisory software. System testing tests operations of the integrated circuit(s) and system in actual application for efficiency and satisfactory operation of fixed or mobile video display for continuity of data transfer and content, display and other user interface operation and other such operation that is apparent to the human user and can be evaluated by system use. If further increased efficiency is called for, parameter(s) are reconfigured for further testing. Adjusted parameter(s) are loaded into the Flash memory or otherwise, components are assembled on a printed wiring board PWB to produce resulting system units.

The electronic monitoring devices and processing described herein is suitably supported by any one or more of RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays. Other types of integrated circuits are applied, such as ASICs (application specific integrated circuits) and gate arrays and all circuits to which the advantages of the improvements described herein commend their use.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention. Steps in flow diagrams may in some cases be changed in their order, supplemented or deleted to form still further process embodiments.

ASPECTS (See Notes paragraph at end of this Aspects section.)

24A. The electronic circuit claimed in claim 24 wherein said processor is operable to establish at least one protected medium duration for USB-like wireless operations by a process selected from the group consisting of: 1) hybrid coordination function controlled channel access (HCCA), 2) clear to send (CTS) to itself, 3) notice of absence (NoA), 4) separate channels.

Notes about Aspects above: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, includes, having, has, with, or variants thereof are used in the detailed description and/or the claims to denote non-exhaustive inclusion in a manner similar to the term comprising. The appended claims and their equivalents should be interpreted to cover any such embodiments, modifications, and embodiments as fall within the scope of the invention.

What is claimed is:

1. A master electronic circuit comprising:
a storage representing a wireless collision avoidance networking process involving collision avoidance overhead and combined with a schedulable process including a serial data transfer process and a scheduler;
a wireless modem operable to transmit and receive wireless signals for the networking process; and
a processor coupled with said storage and with said wireless modem and operable to execute the scheduler to establish and transmit a schedule for plural serial data transfers involving the processor and distinct station identifications, and to execute the serial data transfers inside the networking process and according to the schedule so as to avoid at least some of the collision avoidance overhead.

2. The master electronic circuit claimed in claim 1 wherein said processor is further operable according to the networking process to determine an available wireless medium data rate and to receive service requests via said wireless modem and to use both the wireless medium data rate and the service requests as input to the scheduler.

3. The master electronic circuit claimed in claim 1 wherein said processor is further operable according to the networking process to transmit the schedule by transmitting periodic beacon signals with the schedule entirely in a given beacon signal outside an interval between the periodic beacon signals.

4. The master electronic circuit claimed in claim 3 wherein said processor is further operable to generate the schedule for the given beacon signal based on A) an available wireless data rate for the serial data transfers, B) at least one latency datum, and C) at least one effective serial data rate datum.

5. The master electronic circuit claimed in claim 3 wherein said processor is further operable to generate the schedule for the given beacon signal to specify one or more station identifiers and for each specified station identifier to specify a type of data transfer, a start time for the data transfer, and a duration for the data transfer.

6. The master electronic circuit claimed in claim 1 wherein said processor is further operable to generate a second schedule having a duration datum representing at least one duration encompassing a pair of transfers in the first-named schedule.

7. The master electronic circuit claimed in claim 6 wherein said processor is further operable in accordance with the second schedule to generate medium protection control signals and use said wireless modem to transmit the medium protection control signals to protect the medium for the serial data transfers during an actual duration represented by the duration datum.

8. The master electronic circuit claimed in claim 1 wherein said processor is operable to conduct polling operations via said wireless modem and to execute the scheduler to schedule times for the serial data transfers responsive to a polling-received latency request for at least one of the serial data transfers.

9. The master electronic circuit claimed in claim 1 wherein said processor is operable to conduct polling operations via said wireless modem and to execute the scheduler to allocate time sub-intervals related in width to a polling-received requested data transfer bandwidth for at least one of the serial data transfers.

10. The master electronic circuit claimed in claim 1 wherein said processor is further operable to generate the schedule in a manner that effectively leaves a spacing interval between a pair of the scheduled serial data transfers and so that the spacing interval is wide enough for wireless collision avoidance networking operation.

11. A slave electronic circuit comprising:
a storage representing a wireless collision avoidance networking process involving collision avoidance overhead and combined with a schedule-driven serial data transfer process;
a wireless modem operable to transmit and receive wireless signals for the networking process; and
a processor coupled with said storage and with said wireless modem and operable to receive a schedule for plural serial data transfers involving the processor and distinct station identifications, and to execute any serial data transfers scheduled for the slave inside the wireless networking process and according to the schedule so as to avoid at least some of the collision avoidance overhead.

12. The slave electronic circuit claimed in claim 11 wherein the wireless collision avoidance networking process involves detection of periodic beacon signals and said processor is further operable according to the networking process to obtain the schedule entirely from a given beacon signal independent of an interval between the periodic beacon signals.

13. The slave electronic circuit claimed in claim 11 wherein the processor coupled with said storage is operable to generate a service request and transmit the service request via said wireless modem.

14. The slave electronic circuit claimed in claim 11 wherein the schedule has at least one station identifier and for each specified station identifier the schedule specifies a type of data transfer and scheduled time for that data transfer, and said processor is further operable to respond to a portion of the schedule that specifies a station identifier identifying the slave itself.

15. The slave electronic circuit claimed in claim 14 wherein said processor is further operable to receive a medium protection control signal via said wireless modem and to responsively prevent transmission via said wireless modem unless the specified station identifier has identified the slave electronic circuit itself for serial data transfer transmission from the slave electronic circuit at a scheduled time under medium protection.

16. The slave electronic circuit claimed in claim 11 wherein said processor is further operable to perform a power management process in response to the received schedule.

17. A wireless master process comprising:
a wireless collision avoidance networking process involving collision avoidance overhead;
a schedulable serial data transfer process combined with the wireless collision avoidance networking process, and including a scheduling process to establish and wirelessly transmit a schedule in advance for subsequent serial data transfers involving distinct station identifications;
protecting the wireless medium in a manner that will at least piecewise encompass the scheduled serial data transfers; and
wirelessly executing the serial data transfers according to the schedule so as to avoid at least some of the collision avoidance overhead.

18. The wireless master process claimed in claim 17 wherein the scheduling process includes transmitting periodic beacon signals with the schedule entirely in a given beacon signal outside an interval between the periodic beacon signals, whereby to wirelessly transmit the schedule.

19. A wireless slave process comprising:
a wireless collision avoidance networking process involving collision avoidance overhead and combined with a schedule-driven serial data transfer process;
wirelessly receiving a schedule for specifying serial data transfers and their station identifications; and
executing any serial data transfers scheduled by a such station identification for the slave process itself inside the wireless networking process and according to the schedule so as to obviate at least some of the collision avoidance overhead.

20. The wireless slave process claimed in claim 19 wherein the wireless collision avoidance networking process involves detection of periodic beacon signals, and the slave process obtaining an entire such schedule from a given beacon signal alone.

21. The wireless slave process claimed in claim 19 further comprising wirelessly receiving a medium protection control signal and responsively preventing transmission except at a scheduled time for which the specified station identification has identified the slave process itself for serial data transfer under medium protection.

* * * * *